(12) United States Patent
Chin et al.

(10) Patent No.: US 12,438,647 B2
(45) Date of Patent: Oct. 7, 2025

(54) METHODS FOR INTERPRETING DOWNLINK CONTROL INFORMATION AND USER EQUIPMENT USING THE SAME

(71) Applicant: SHARP KABUSHIKI KAISHA, Sakai (JP)

(72) Inventors: Heng-Li Chin, Taipei (TW); Chia-Hung Wei, Taipei (TW); Hai-Han Wang, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 362 days.

(21) Appl. No.: 18/031,055

(22) PCT Filed: Oct. 13, 2021

(86) PCT No.: PCT/CN2021/123517
§ 371 (c)(1),
(2) Date: Apr. 10, 2023

(87) PCT Pub. No.: WO2022/078381
PCT Pub. Date: Apr. 21, 2022

(65) Prior Publication Data
US 2023/0379092 A1 Nov. 23, 2023

Related U.S. Application Data

(60) Provisional application No. 63/091,239, filed on Oct. 13, 2020.

(51) Int. Cl.
*H04L 1/1829* (2023.01)
*H04W 72/1268* (2023.01)
(Continued)

(52) U.S. Cl.
CPC ....... *H04L 1/1848* (2013.01); *H04W 72/1268* (2013.01); *H04W 72/231* (2023.01); *H04W 72/232* (2023.01)

(58) Field of Classification Search
CPC ... H04L 1/1848; H04L 1/1854; H04L 1/1822; H04W 72/1268; H04W 72/231; H04W 72/232; H04W 72/23
See application file for complete search history.

(56) References Cited

U.S. PATENT DOCUMENTS

| 2019/0246391 A1 | 8/2019 | Zhang et al. |
| 2020/0053778 A1 | 2/2020 | Babaei et al. |

(Continued)

FOREIGN PATENT DOCUMENTS

| CN | 110474753 A | 11/2019 |
| CN | 111670597 A | 9/2020 |

OTHER PUBLICATIONS

Huawei et al., "[H227] Tp for the description of CG configuration", R2-2003639, 3GPP TSG-RAN WG2 Meeting #109bis-e, Electronic, Apr. 20-May 1, 2020.

(Continued)

*Primary Examiner* — Hoang-Chuong Q Vu
(74) *Attorney, Agent, or Firm* — ScienBiziP, P.C.

(57) ABSTRACT

A method performed by a user equipment (UE) for interpreting downlink control information (DCI) is disclosed. The method includes receiving a radio resource control (RRC) message; receiving DCI; determining a configuration status of a first information element (IE) in the RRC message; and interpreting the DCI by considering a field size of a downlink feedback information (DFI) flag included in the DCI to be associated with the configuration status of the first IE in the RRC message. In addition, a UE using the method is also disclosed.

16 Claims, 9 Drawing Sheets

(51) Int. Cl.
 *H04W 72/231* (2023.01)
 *H04W 72/232* (2023.01)

(56) References Cited

U.S. PATENT DOCUMENTS

| | | | |
|---|---|---|---|
| 2020/0221310 A1 | 7/2020 | Babaei et al. | |
| 2021/0105812 A1* | 4/2021 | Rastegardoost | H04L 1/1671 |
| 2021/0160879 A1* | 5/2021 | Lin | H04W 72/0453 |
| 2021/0160919 A1 | 5/2021 | Wang et al. | |
| 2021/0400714 A1* | 12/2021 | Huang | H04W 72/23 |
| 2022/0255672 A1* | 8/2022 | Tao | H04L 1/1864 |
| 2023/0269772 A1* | 8/2023 | Chen | H04W 74/0808 370/329 |

OTHER PUBLICATIONS

3GPP TS 37.213 V16.2.0 (Jun. 2020), 3rd Generation Partnership Project; Technical Specification Group Radio Access Network; Physical layer procedures for shared spectrum channel access (Release 16).

3GPP TS 38.214 V16.2.0 (Jun. 2020), 3rd Generation Partnership Project; Technical Specification Group Radio Access Network; NR; Physical layer procedures for data (Release 16).

3GPP TS 38.331 V16.1.0 (Jul. 2020), 3rd Generation Partnership Project; Technical Specification Group Radio Access Network; NR; Radio Resource Control (RRC) protocol specification (Release 16).

* cited by examiner

METHODS FOR INTERPRETING DOWNLINK CONTROL INFORMATION AND USER EQUIPMENT USING THE SAME

CROSS-REFERENCE TO RELATED APPLICATION(S)

This application is the National Stage application of International Patent Application Serial No. PCT/CN2021/123517, filed on Oct. 13, 2021, which claims the benefit of and priority to U.S. Provisional Patent Application Ser. No. 63/091,239, filed on Oct. 13, 2020. The content(s) of all of the above-mentioned applications are hereby incorporated herein fully by reference for all purposes.

FIELD

The present disclosure generally relates to wireless communications, and more specifically, to methods for interpreting downlink control information (DCI) and user equipment (UE) using the same.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure is directed to a method for interpreting DCI and a UE using the same.

In a first aspect of the present application, a method performed by a UE for interpreting DCI is provided. The method includes: receiving a radio resource control (RRC) message; receiving DCI; determining a configuration status of a first information element (IE) in the RRC message; and interpreting the DCI by considering a field size of a downlink feedback information (DFI) flag included in the DCI to be associated with the configuration status of the first IE in the RRC message.

In an implementation of the first aspect, interpreting the DCI by considering the field size of the DFI flag included in the DCI to be associated with the configuration status of the first IE in the RRC message includes: in a case that the first IE is configured in the RRC message, interpreting the DCI by considering the field size of the DFI flag included in the DCI to be 1 bit; and in a case that the first IE is not configured in the RRC message, interpreting the DCI by considering the field size of the DFI flag included in the DCI to be 0 bit.

In another implementation of the first aspect, the DCI is received on a shared spectrum.

In another implementation of the first aspect, the first IE is configured to indicate whether the UE is capable of performing a retransmission on a configured grant physical uplink shared channel (CG-PUSCH).

In another implementation of the first aspect, the first IE is configured for the UE to start a timer upon a transmission on a CG-PUSCH.

In another implementation of the first aspect, the first IE is included in a second IE and the second IE is used to configure a configured grant (CG) configuration.

In another implementation of the first aspect, the first IE is denoted as cg-RetransmissionTimer.

In another implementation of the first aspect, the RRC message is an RRC reconfiguration message.

In a second aspect of the present application, a UE for interpreting DCI is provided. The UE includes a processing circuitry, a transceiver coupled to the processing circuitry, and a memory coupled to the processing circuitry. The memory stores at least one computer-executable program that, when executed by the processing circuitry, causes the processing circuitry to: receive an RRC message via the transceiver; receive DCI via the transceiver; determine a configuration status of a first IE in the RRC message; and interpret the DCI by considering a field size of a DFI flag included in the DCI to be associated with the configuration status of the first IE in the RRC message.

In another implementation of the second aspect, interpreting the DCI by considering the field size of the DFI flag included in the DCI to be associated with the configuration status of the first IE in the RRC message includes: in a case that the first IE is configured in the RRC message, interpreting the DCI by considering the field size of the DFI flag included in the DCI to be 1 bit; and in a case that the first IE is not configured in the RRC message, interpreting the DCI by considering the field size of the DFI flag included in the DCI to be 0 bit.

In another implementation of the second aspect, receiving the DCI via the transceiver includes receiving the DCI on a shared spectrum via the transceiver.

In another implementation of the second aspect, the first IE is configured to indicate whether the UE is capable of performing a retransmission on a CG-PUSCH.

In another implementation of the second aspect, the first IE is configured for the UE to start a timer upon a transmission on a CG-PUSCH.

In another implementation of the second aspect, the first IE is included in a second IE and the second IE is used to configure a CG configuration.

In another implementation of the second aspect, the first IE is denoted as cg-RetransmissionTimer.

In another implementation of the second aspect, the RRC message is an RRC reconfiguration message.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DESCRIPTION

Figure 1:
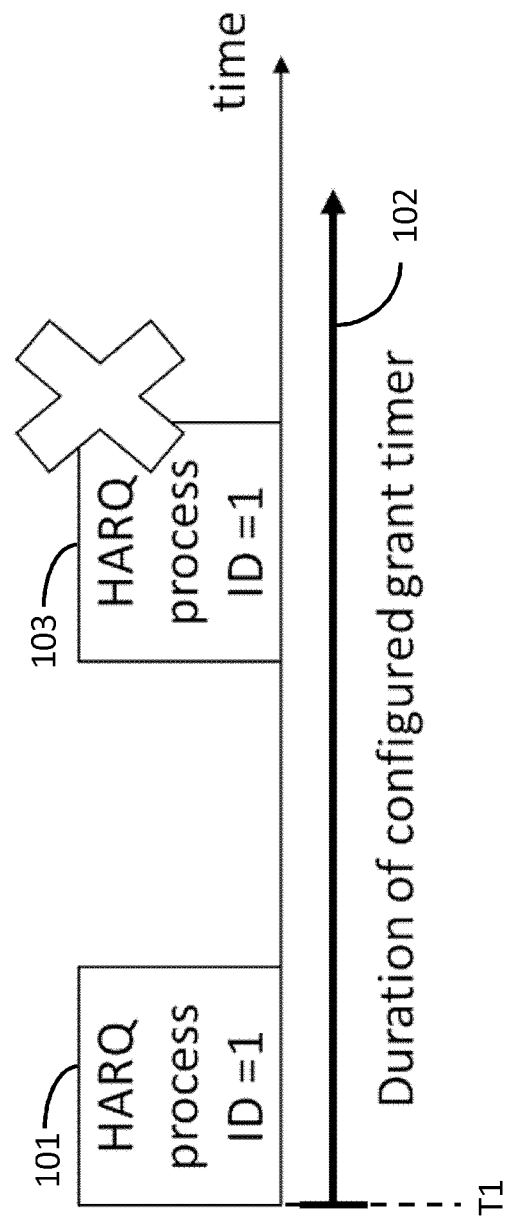
FIG. 1 is a diagram illustrating an operation of a configured grant (CG) timer according to an example implementation of the present application.

The terms mentioned in the present disclosure are defined as follows. Unless otherwise specified, the terms in the present disclosure have the following meanings.

| Abbreviation | Full name |
| --- | --- |
| 3GPP | 3rd Generation Partnership Project |
| 5G | 5th generation |
| ACK | Acknowledge |
| BF | Beam Failure |
| BFD | Beam Failure Detection |
| BFI | Beam Failure Instance |
| BFR | Beam Failure Recovery |
| BFRQ | Beam Failure Recovery Request |
| BFRR | Beam Failure Recovery Response |
| BLER | Block Error Rate |
| BS | Base Station |
| BSR | Buffer Status Report |
| BWP | Band Width Part |
| CC | Component Carriers |
| CCA | Clear Channel Assessment |
| CE | Control Element |
| CSI | Channel State Information |
| CSI-RS | Channel State Information based Reference Signal |
| CQI | Channel Quality Indicator |
| CRC | Cyclic Redundancy Check |
| C-RNTI | Cell Radio Network Temporary Identifier |
| CS-RNTI | Configured Scheduling Radio Network Temporary Identifier |
| COT | Channel Occupancy Time |
| DCI | Downlink Control Information |
| DFI | Downlink Feedback Information |
| DL | Downlink |
| DRX | Discontinuous Reception |
| FBE | Frame Based Equipment |
| FFP | Fixed Frame Period |
| GC-PDCCH | Group Common Physical Downlink Control Channel |
| HARQ | Hybrid Automatic Repeat Request |
| ID | Identity |
| IE | Information Element |
| IIoT | Industrial Internet of Things |
| L1 | Layer 1 |
| L2 | Layer 2 |
| LAA | Licensed Assisted Access |
| LBE | Load Based Equipment |
| LBT | Listen Before Talk |
| LCID | Logical Channel Identity |
| LSB | Least Significant Bit |
| LTE | Long Term Evolution |
| MAC | Medium Access Control |
| MCG | Master Cell Group |
| MIMO | Multi-input Multi-output |
| MCS-C-RNTI | Modulation Coding Scheme Cell Radio Network Temporary Identifier |
| MSB | Most Significant Bit |
| Msg | Message |
| NACK | Negative Acknowledge |
| NAS | Non-Access Stratum |
| NBI | New Beam Identification |
| NDI | New Data Indicator |
| NR | New RAT/Radio |
| NR-U | New Radio Unlicensed |
| NW | Network |
| PBCH | Physical Broadcast Channel |
| PCell | Primary Cell |
| PDCCH | Physical Downlink Control Channel |
| PDSCH | Physical Downlink Shared Channel |
| PDCP | Packet Data Convergence Protocol |
| PDU | Protocol Data Unit |
| PHY Layer | Physical Layer |
| PRACH | Physical Random Access Channel |
| PSCell | Primary SCell |
| PUCCH | Physical Uplink Control Channel |
| PUSCH | Physical Uplink Shared Channel |
| QoS | Quality of Service |
| RA | Random Access |
| RACH | Random Access Channel |
| RAN | Random Access Network |
| RAR | Random Access Response |
| Rel | Release |
| RF | Radio Frequency |
| RLAN | Radio Local Area Network |
| RLF | Radio Link Control |
| RMSI | Remaining Minimum System Information |
| RNTI | Radio Network Temporary Identifier |
| RRC | Radio Resource Control |
| RS | Reference Signal |
| RSRP | Reference Signal Received Power |
| RV | Redundancy Version |
| Rx | Reception |
| SCell | Secondary Cell |
| SCG | Secondary Cell Group |
| SCS | SubCarrier Spacing |
| SDAP | Service Data Adaptation Protocol |
| SDU | Service Data Unit |
| SFN | System Frame Number |
| SINR | Signal to Interference plus Noise Ratio |
| SLIV | Start and Length Indicator Value |
| SR | Scheduling Request |
| SRS | Sounding Reference Signal |
| SSB | Synchronization Signal Block |
| SpCell | Special Cell |
| TB | Transport Block |
| TBS | Transport Block Size |
| TCI | Transmission Configuration Indication |
| TR | Technical Report |
| TRP | Transmission/Reception Point |
| TS | Technical Specification |
| TX | Transmission |
| UCI | Uplink Control Information |
| UE | User Equipment |
| UL | Uplink |
| URLLC | Ultra Reliable Low Latency Communication |
| WG | Working Group |
| WI | Working Item |

The following contains specific information pertaining to example implementations in the present disclosure. The drawings and their accompanying detailed disclosure are directed to merely example implementations of the present disclosure. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure may include a particular feature, structure, or characteristic, but not every possible implementation of the present disclosure necessarily includes the particular feature, structure, or characteristic. Further, repeated use of the phrase "In some implementations," "in an example implementation," or "an implementation," does not necessarily refer to the same implementation, although they may. Moreover, any use of phrases like "implementations" in connection with "the present disclosure" are never meant to characterize that all implementations of the present disclosure must include the particular feature, structure, or characteristic, and should instead be understood to mean "at least some implementations of the present disclosure" include the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the disclosed combination, group, series, and the equivalent. The terms "system" and "network" in the present disclosure may be used interchangeably.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists. The character "/" used herein generally represents that the former and latter associated objects are in an "or" relationship.

Additionally, for a non-limiting explanation, specific details, such as functional entities, techniques, protocols, standards, and the like, are set forth for providing an understanding of the disclosed technology. In other examples, detailed disclosure of well-known methods, technologies, systems, architectures, and the like are omitted so as not to obscure the present disclosure with unnecessary details.

Persons skilled in the art will immediately recognize that any network function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium, such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Application-Specific Integrated Circuits (ASICs), programmable logic arrays, and/or one or more Digital Signal Processors (DSPs). Although some of the example implementations disclosed are oriented to software installed and executing on computer hardware, alternative example implementations implemented as firmware, as hardware, or as a combination of hardware and software are well within the scope of the present disclosure.

The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, or an LTE-Advanced Pro system) may typically include at least one Base Station (BS), at least one UE, and one or more optional network elements that provide connection towards a network. The UE may communicate with the network (e.g., a Core Network (CN), an Evolved Packet Core (EPC) network, an Evolved Universal Terrestrial Radio Access Network (E-UTRAN), a Next-Generation Core (NGC), or an Internet), through a Radio Access Network (RAN) established by the BS.

In the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a Node B (NB) as in the Universal Mobile Telecommunication System (UMTS), an evolved Node B (eNB) as in the LTE-A, a Radio Network Controller (RNC) as in the UNITS, a Base Station Controller (BSC) as in the Global System for Mobile communications (GSM)/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UNITS (often referred to as 3G) based on basic Wideband-Code Division Multiple Access (W-CDMA), High-Speed Packet Access (HSPA), LTE, LTE-A, enhanced L (eLTE), NR (often referred to as 5G), and LTE-A Pro. However, the scope of the present disclosure should not be limited to the protocols mentioned above.

The BS may be operable to provide radio coverage to a specific geographical area using a plurality of cells included in the RAN. The BS may support the operations of the cells.

Each cell may be operable to provide services to at least one UE within its radio coverage. More specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmissions). The BS may communicate with one or more UEs in the radio communication system through the plurality of cells. A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed to in the $3^{rd}$ Generation Partnership Project (3GPP), may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or the service applications.

Moreover, it is also considered that in a transmission time interval of a single NR frame, at least DL transmission data, a guard period, and UL transmission data should be included, where the respective portions of the DL transmission data, the guard period, and the UL transmission data should also be configurable, for example, based on the network dynamics of NR. Besides, an SL resource may also be provided in an NR frame to support ProSe services.

NR-based Access to Unlicensed Spectrum has been agreed to by 3GPP as one of the WIs for NR Rel-16. This WI specifies NR enhancements for a single global solution framework for access to unlicensed spectrum which enables operation of NR in the 5 GHz and the 6 GHz unlicensed bands, taking into account regional regulatory requirements. The NR-U design should enable fair coexistence between already deployed Wi-Fi generations and NR-U, between NR-U and LTE-LAA, between different NR-U systems, etc.

In an unlicensed spectrum (e.g., shared spectrum), a UE may be required to perform channel access (e.g., LBT/CCA) before performing a transmission in order to make sure there is no other device occupying the channel where the transmission is intended to be performed. For a channel access mechanism in NR-U, an LTE-LAA LBT mechanism may be adopted as baseline for 5 GHz band and adopted as the starting point of the design for 6 GHz band. At least for a band where absence of Wi-Fi cannot be guaranteed (e.g. by regulation), LBT may be performed in units of 20 MHz. In general, there are 4 LBT categories. For NR-U, a UE may perform LBT using one of the 4 LBT categories before performing a UL transmission. Specifically, a UE may perform LBT using different LBT categories before performing a UL transmission (e.g., PRACH, PUCCH, PUSCH, SRS transmission, etc.) The 4 LBT categories are introduced below.

Category 1: Immediate Transmission after a Short Switching Gap

This LBT category may be used for a transmitter to immediately transmit after a switching gap inside a COT. In some implementations, the switching gap from reception to transmission is for accommodating the transceiver turn-around time and is not longer than 16 μs. Note that Category 1 may also be known as a Type 2 UL channel access procedure according to 3GPP TS 37.213 V16.2.0.

Category 2: LBT without Random Back-Off

The duration of time that the channel (where transmission is intended to be performed) is sensed to be idle before the transmitting entity transmits is deterministic. Note that Category 2 may also be known as a Type 2 UL channel access procedure according to 3GPP TS 37.213 V16.2.0.

Category 3: LBT with Random Back-Off with a Contention Window of Fixed Size

The LBT procedure has the following procedure as one of its components. The transmitting entity draws a random number N within a contention window. The size of the contention window is specified by a "minimum possible value of N" and a "maximum possible value of N". The size of the contention window is fixed. The random number N is used in the LBT procedure to determine the duration of time that the channel (where transmission is intended to be performed) is sensed to be idle before the transmitting entity transmits on the channel. In one example, the "minimum possible value of N" and "the maximum possible value of N" may be determined by a channel access priority class of a UE. Moreover, the channel access priority class may be determined based on the type of UL transmission that the UE intends to perform.

Category 4: LBT with Random Back-Off with a Contention Window of Variable Size

The LBT procedure has the following as one of its components. The transmitting entity draws a random number N within a contention window. The size of contention window is specified by a "minimum possible value of N" and a "maximum possible value of N". The transmitting entity can vary the size of the contention window when drawing the random number N. The random number N is used in the LBT procedure to determine the duration of time that the channel (where transmission is intended to be performed) is sensed to be idle before the transmitting entity transmits on the channel. Note that Category 4 may also be known as a Type 1 UL channel access procedure according to 3GPP TS 37.213 V16.2.0. In one example, the "minimum possible value of N" and "the maximum possible value of N" may be determined by a channel access priority class of a UE. Moreover, the channel access priority class may be determined based on the type of UL transmission that the UE intends to perform.

In some implementations, the transmission may be performed by a UE in a case that the LBT is successful (e.g., explained under each LBT category as shown above), and the maximum continuous transmission time may be predetermined by a COT value. If LBT category 2, 3 or 4 is used for performing LBT, the LBT may be considered successful if the channel is sensed to be idle (e.g., the power detected by a UE which intends to perform a UL transmission is less than a predetermined/configured power threshold) for a predetermined/configured duration of time during an LBT procedure. If the UE performs LBT using LBT category 1, the LBT may be considered successful; otherwise, the LBT may be considered failure or not successful. In some implementations, when an LBT for a UL transmission is considered failure or not successful, the MAC entity may receive an LBT failure indication from PHY.

An FBE is an equipment that may operate in an unlicensed environment. The transmit/receive structure of an FBE has a periodic timing with a periodicity equal to a fixed frame period (FFP). Two types of devices are defined for FBE operation. Specifically, a device that initiates a sequence of one or more transmissions is defined as the initiating device; otherwise, the device is defined as a responding device.

To initiate a sequence of one or more transmissions, an initiating device may perform a clear channel assessment (CCA) check during a single observation slot/idle period immediately before starting transmissions on an operating channel at the start of an FFP. If the operating channel is found to be clear, the initiating device may start the transmission immediately in the FFP. Otherwise, there shall be no transmissions on the operating channel during the FFP. Please note that the observation slot/idle period for the CCA and duration for the transmission may be in the same FFP.

An initiating device is allowed to grant an authorization to one or more associated responding devices to transmit on a current operating channel within a current COT. For example, a responding device may proceed transmissions without performing a CCA if it receives a grant and if these transmissions are initiated at most 16 μs after the last transmission performed by the initiating device that issued the grant. For example, a responding device may perform a CCA on the operating channel during a single observation slot within a 25-μs period ending immediately before the granted transmission time which is later than 16 μs after the last transmission performed by the initiating device that issued the grant. In another example, a responding device may perform a CCA, which starts from 16 μs after the last transmission performed by the initiating device that issued the grant and ends immediately before the granted transmission time. Moreover, the CCA may be 25 μs long.

In NR Rel-16 NR-U, the gNB may operate as an initiating device. The gNB may provide the FFP configuration to a UE via system information block type 1 (SIB1) or dedicated RRC signaling. For example, the UE may be configured, by the network, channelAccessMode=SemiStaticChannelAccessConfig via SIB1 or dedicated RRC signaling. The FFP (for example, but not limited to, defined by the period IE in the SemiStaticChannelAccessConfig IE) may be restricted to values of 1 ms, 2 ms, 2.5 ms, 4 ms, 5 ms, and 10 ms. The starting positions of the FFPs within every two radio frames may start from an even radio frame and are given by i*P, where i=0, 1, . . . , 20/P−1, and where P is the fixed frame period in milliseconds. The observation slot/idle period for a given SCS=ceil (minimum observation slot/idle period allowed by regulations/Ts), where the minimum observation slot/idle period allowed=max (5% of FFP, 100 us), and Ts is the symbol duration for the given SCS. UE transmissions within a fixed frame period may occur if DL signals/channels (e.g., PDCCH, SSB, PBCH, RMSI, GC-PDCCH, . . . ) within the fixed frame period are detected.

In some implementations, a PRACH resource may be considered invalid if it overlaps with the observation slot/idle period of an FFP when FBE operation is indicated.

With configured uplink grants, the network may allocate UL resources (e.g., PUSCH resources) for the initial HARQ transmissions to UEs via an RRC configuration and a PDCCH. Two configured grant (CG) types of configured uplink grants are defined below.

With CG Type 1, RRC may directly provide the configured uplink grant including the periodicity. The UL resource (e.g., PUSCH resource) that corresponds to the CG Type 1 configuration is configured directly by the network via RRC signaling.

With CG Type 2, RRC may define the periodicity of the configured uplink grant while PDCCH addressed to CS-RNTI can either signal and activate the configured uplink grant or deactivate it. Specifically, a PDCCH addressed to CS-RNTI may indicate that the uplink grant can be implicitly reused according to the periodicity defined by RRC, until deactivated. In another word, the uplink resource scheduled by the uplink grant, as indicated by the PDCCH addressed to CS-RNTI, may occur periodically according to the periodicity defined by RRC, until deactivated.

The CG Type 1 and Type 2 may be configured by RRC per Serving Cell and per BWP. Multiple configurations may only be active simultaneously on different Serving Cells. For CG Type 2, activation and deactivation may be independent among the Serving Cells. For the same Serving Cell, the MAC entity may be configured with either CG Type 1 or Type 2.

In some implementations, RRC may configure the following parameters (a) to (e) when the CG Type 1 is configured:
(a) cs-RNTI: CS-RNTI for retransmission;
(b) periodicity: periodicity of the CG Type 1;
(c) timeDomainOffset: offset of a resource with respect to SFN=0 in time domain;
(d) timeDomainAllocation: allocation of configured uplink grant in time domain which contains startSymbolAndLength (i.e., SLIV in 3GPP TS 38.214 V16.2.0); and
(e) nrofHARQ-Processes: the number of HARQ processes for CG.

In some implementations, upon configuration of a CG Type 1 for a Serving Cell by upper layers, the MAC entity may store the uplink grant provided by upper layers as a configured uplink grant for the indicated Serving Cell; and/or initialize or re-initialize the configured uplink grant to start in the symbol according to the parameters timeDomainOffset and S (derived from SLIV as specified in 3GPP TS 38.214 V16.2.0), and to reoccur with the parameter periodicity.

In NR Rel-15, a CG timer (e.g., configuredGrantTimer IE) is introduced.

FIG. 1 is a diagram illustrating an operation of a CG timer according to an example implementation of the present application.

Referring to FIG. 1, a CG timer (e.g., configuredGrantTimer) 102 may be maintained per HARQ process ID. For example, once a UE performs a transmission/retransmission at a time point T1 (e.g., on a resource indicated by an uplink grant addressed to C-RNTI) and the identified HARQ process is configured for a configured uplink grant, on a PUSCH 101 that corresponds to a configured uplink grant (i.e., CG PUSCH 101), or on a resource indicated by an uplink grant addressed to CS-RNTI), a CG timer (e.g., configuredGrantTimer) 102 that corresponds to the HARQ process ID (e.g., 1) corresponding to the transmission/retransmission is started/restarted at the time point T1. While the CG timer (e.g., configuredGrantTimer) 102 that corresponds to a HARQ process ID (e.g., 1) is running, the UE is prohibited from performing a new transmission (e.g., generate a new TB/MAC PDU for transmission) on a CG PUSCH 103 of the same HARQ process ID (e.g., 1). In other words, the latest CG PUSCH 103 shown in FIG. 1 cannot be used for a new transmission until the CG timer (e.g., configuredGrantTimer) 102 expires.

Several new features related to configured uplink grant are introduced to ensure configured uplink grants mechanism can operate smoothly in an unlicensed environment (e.g., shared spectrum) where LBT failure may occur. In some implementations, a CG configuration may apply at least one of the introduced features in a case that a specific timer for retransmission (e.g., cg-RetransmissionTimer IE) is configured in the CG configuration (e.g., ConfiguredGrantConfig IE). In some implementations, the specific timer for retransmission (e.g., cg-RetransmissionTimer IE) may always be configured in a CG configuration (e.g., ConfiguredGrantConfigIE) in an unlicensed environment (e.g., shared spectrum), and may not be configured in a CG configuration (e.g., ConfiguredGrantConfigIE) in a licensed environment (e.g., licensed spectrum). The new features 1-1 to 1-5 introduced in NR Rel-16 NR-U WI are listed below.
Feature 1-1: HARQ Process ID Selection of a CG PUSCH Based on UE Implementation The selection of HARQ process ID for a CG PUSCH may be based on UE implementation. Specifically, a UE may select a HARQ process ID for a CG PUSCH among multiple HARQ process IDs available for the CG configuration. More specifically, the HARQ process IDs available for the CG configuration may be determined based on the value of two parameters, harq-procID-Offset and nrofHARQ-Processes, as configured in the CG configuration (e.g., ConfiguredGrantConfig IE).

In some implementations, if both harq-procID-Offset and nrofHARQ-Processes are configured in a CG configuration (e.g., ConfiguredGrantConfig IE), a UE may select a HARQ process ID for a CG PUSCH within a range from harq-procID-Offset to harq-procID-Offset+nrofHARQ-Processes−1.

In some implementations, if only nrofHARQ-Processes is configured in a CG configuration (e.g., ConfiguredGrantConfig IE), a UE may select a HARQ process ID for a CG PUSCH within a range from zero to nrofHARQ-Processes−1.

In some implementations, harq-procID-Offset may always be configured together with cg-RetransmissionTimer in a CG configuration (e.g., ConfiguredGrantConfigIE) in an unlicensed environment (e.g., shared spectrum).

In some implementations, a UE may prioritize retransmissions before initial transmissions when selecting a HARQ process ID for a CG PUSCH.

In some implementations, when selecting a HARQ process ID of a CG PUSCH based on UE implementation, a CG uplink control information (CG-UCI) may be used to indicate the HARQ process ID that is selected for the CG PUSCH. The CG-UCI may be, for example, multiplexed on the CG PUSCH.

In some implementations, a CG-UCI may include HARQ process ID, RV, NDI, and COT information of a CG PUSCH (that the CG-UCI multiplexes with, for example).

In some implementations, the UE may toggle the NDI in the CG-UCI for new transmissions and may not toggle the NDI in the CG-UCI for retransmissions.
Feature 1-2: RV Selection of a CG PUSCH Based on UE Implementation In some implementations, a UE may select an RV of a CG PUSCH based on UE implementation, where the CG PUSCH may be for initial transmission or for retransmission (e.g., repetition).
Feature 1-3: Autonomous Retransmission of a MAC PDU/TB on a CG PUSCH When a UE fails to transmit a generated MAC PDU/TB on a first CG PUSCH, the UE may perform autonomous retransmission on a second CG PUSCH if a certain condition is satisfied. Specifically, the UE may fail to transmit a MAC PDU/TB due to LBT failure (e.g., the UE senses the channel to be busy, the UE receives an LBT failure indication, etc.). The UE may consider the NDI bit to not have been toggled when it determines to perform autonomous retransmission on a second CG PUSCH. When a UE fails to transmit a generated MAC PDU/TB on a first CG PUSCH, the UE may perform autonomous retransmission on a second CG PUSCH based on one or more of the following conditions (a) to (e).

(a) The TBS of the first CG PUSCH and the second CG PUSCH are the same.

(b) The first CG PUSCH and the second CG PUSCH has the same HARQ process ID.

(c) The CG configurations that the first CG PUSCH and the second CG PUSCH correspond to are configured in the same BWP.

Specifically, the CG configurations that correspond to the first CG PUSCH and the second CG PUSCH may or may not be the same. However, they need to be configured in the same BWP for retransmission on the second CG PUSCH.

(d) The network has not provided a dynamic grant for retransmission on the first CG PUSCH.

Specifically, the dynamic grant for retransmission on the first CG PUSCH may have the same HARQ process ID as the first CG PUSCH. If the network has provided a dynamic grant (e.g., a UL grant associated with C-RNTI or CS-RNTI) for retransmission on the first CG PUSCH before the second CG PUSCH becomes available, the second CG PUSCH may not be used for autonomous retransmission.

(e) The CG retransmission timer (e.g., cg-RetransmissionTimer) that correspond to the HARQ process ID of the first PUSCH is not running.

Specifically, a CG retransmission timer (e.g., cg-RetransmissionTimer) may be configured for each HARQ process ID. The CG retransmission timer (e.g., cg-RetransmissionTimer) may be used to prohibit a UE from performing immediate autonomous retransmission on a CG PUSCH.

Figure 2:
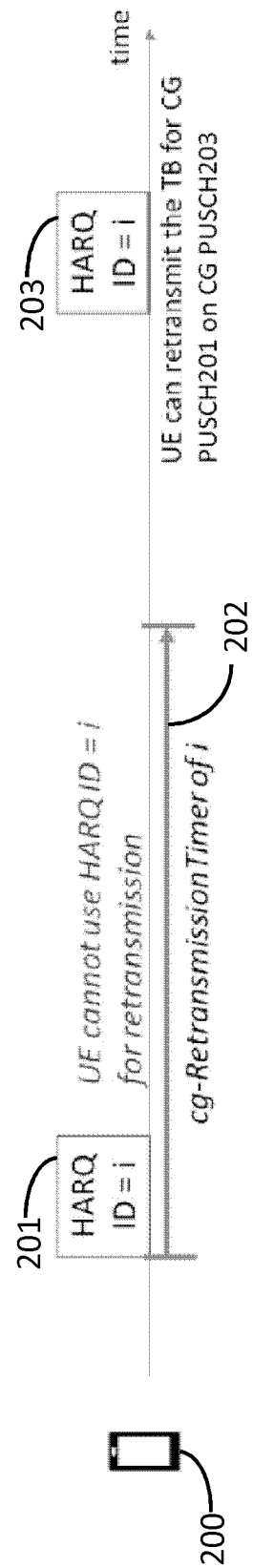
FIG. 2 is a diagram illustrating an operation of a CG retransmission timer according to an example implementation of the present application.

FIG. 2 is a diagram illustrating an operation of a CG retransmission timer according to an example implementation of the present application.

Referring to FIG. 2, a CG retransmission timer (e.g., cg-RetransmissionTimer) 202 may be configured for a HARQ process of a first CG PUSCH 201 having a HARQ process ID (e.g., i). When the UE 200 fails to transmit a generated MAC PDU/TB on the first CG PUSCH 201, the UE 200 may not perform retransmission on the second CG PUSCH 203 having the same HARQ process ID (e.g., i) if the CG retransmission timer (e.g., cg-RetransmissionTimer) 202 is running. On the other hand, if the CG retransmission timer (e.g., cg-RetransmissionTimer) 202 for the HARQ process of the first CG PUSCH 201 is not running or is expired, the UE 200 may perform retransmission on the second CG PUSCH 203.

In some implementations, the CG retransmission timer (e.g., cg-RetransmissionTimer) of a HARQ process may be started or restarted when a transmission (e.g., a new transmission or a retransmission) on a configured uplink grant of the HARQ process is performed successfully (e.g., the UE does not receive an LBT failure indication for the corresponding transmission).

In some implementations, the CG retransmission timer (e.g., cg-RetransmissionTimer) of a HARQ process may be stopped when the UE receives a DFI for the corresponding HARQ process.

In some implementations, the CG retransmission timer (e.g., cg-RetransmissionTimer) of a HARQ process may be stopped when the UE receives a dynamic grant (e.g., a UL grant associated with C-RNTI or CS-RNTI) for the HARQ process.

In some implementations, the CG retransmission timer (e.g., cg-RetransmissionTimer) of a HARQ process may be stopped when the CG timer (e.g., configuredGrantTimer) for the HARQ process expires.

In some implementations, the CG retransmission timer (e.g., cg-RetransmissionTimer) of a HARQ process may be stopped when a CG Type 2 activation command is received for a CG configuration that the HARQ process corresponds to.

Feature 1-4: DFI Transmission from the Network

In some implementations, a UE may be expected to receive DFI from the network. DFI may be indicated via a format 0_1 DCI with CRC scrambled by CS-RNTI. When a UE receives a format 0_1 DCI with CRC scrambled by CS-RNTI, the UE may identify that the received DCI is a DFI if the 1-bit DFI flag in the DCI indicates a value of 1. Moreover, the field size of a DFI flag in a format 0_1 DCI may be either 0-bit or 1-bit. In some implementations, the field size of the DFI flag is 1 bit if the UE is configured to monitor DCI format 0_1 with CRC scrambled by CS-RNTI and for operation in a cell with shared spectrum channel access.

In some implementations, a DFI may include a 16-bit HARQ-ACK bitmap, where the order of the bitmap to HARQ process index mapping is such that HARQ process indices are mapped in ascending order from MSB to LSB of the bitmap. For each bit of the bitmap, value 1 indicates ACK, and value 0 indicates NACK.

In some implementations, a cg-minDFI-Delay IE may be configured in a CG configuration (e.g., ConfiguredGrantConfig IE). When configured in the CG configuration (e.g., ConfiguredGrantConfig IE), the cg-minDFI-Delay IE may indicate the minimum duration (in unit of symbols) from the ending symbol of a CG PUSCH to the starting symbol of the PDCCH containing the DFI carrying HARQ-ACK for the CG PUSCH. The HARQ-ACK received before the minimum duration (e.g., received before a period defined by the minimum duration) may not be considered valid for the CG PUSCH.

In some implementations, the CG retransmission timer (e.g., cg-RetransmissionTimer) of a HARQ process may be stopped when the UE receives a valid DFI for the corresponding HARQ process. Specifically, the CG timer (e.g., configuredGrantTimer) of a HARQ process may be stopped when the UE receives a valid DFI indicating ACK for the corresponding HARQ process.

Feature 1-5: UE Behavior Upon LBT Failure

In some implementations, if a CG PUSCH is not successfully transmitted due to LBT failure, the CG timer (e.g., configuredGrantTimer) that corresponds to the HARQ process ID of the CG PUSCH is not started or restarted. In other words, a CG timer (e.g., configuredGrantTimer) that corresponds to a HARQ process ID is started or restarted in a case that the LBT failure indication is not received from PHY when transmission is performed (e.g., successful transmission) for the HARQ process.

In some implementations, if a CG PUSCH is not successfully transmitted due to LBT failure, the CG retransmission timer (e.g., cg-RetransmissionTimer) that corresponds to the HARQ process ID of the CG PUSCH is not started or restarted. In other words, a CG retransmission timer (e.g., cg-RetransmissionTimer) that corresponds to a HARQ process ID is started or restarted in a case that the LBT failure indication is not received from PHY when transmission is performed (e.g., successful transmission) for the HARQ process.

A device that supports NR Rel-16 IIoT/URLLC features may be operated under a licensed spectrum (e.g., a licensed carrier/cell). Several new features related to configured uplink grant are introduced in NR Rel-16 IIoT/URLLC WI to ensure configured uplink grants mechanism can meet the reliability and delay requirement of IIoT/URLLC traffic. In some implementations, a CG configuration may apply at least one of the introduced features in a case that the CG retransmission timer (e.g., cg-RetransmissionTimer) is not configured in the CG configuration (e.g., ConfiguredGrantConfig IE). In some implementations, the CG retransmission timer (e.g., cg-RetransmissionTimer) may not be configured in a CG configuration (e.g., ConfiguredGrantConfigIE) that operates in a licensed environment (e.g., licensed spectrum). The new features 2-1 to 2-4 introduced in NR Rel-16 IIoT/URLLC WI are listed below.

Feature 2-1: HARQ Process ID Selection of a CG PUSCH Based on a Predefined Equation In some implementations, for a CG configuration that is neither configured with harq-ProcID-Offset2 nor with cg-RetransmissionTimer (e.g., neither harq-ProcID-Offset2 nor with cg-RetransmissionTimer is configured in ConfiguredGrantConfig IE of the CG configuration), the HARQ Process ID associated with the first symbol of a CG PUSCH may be derived from a predefined equation 1:

$$\text{HARQ Process ID} = [\text{floor}(\text{CURRENT\_symbol}/\text{periodicity})] \text{ modulo nrofHARQ-Processes}$$

In some implementations, for a CG configuration that is configured with harq-ProcID-Offset2 (e.g., harq-ProcID-Offset2 is configured in ConfiguredGrantConfig IE of the CG configuration), the HARQ Process ID associated with the first symbol of a CG PUSCH may be derived from a predefined equation 2:

$$\text{HARQ Process ID} = [\text{floor}(\text{CURRENT\_symbol}/\text{periodicity})] \text{ modulo nrofHARQ-Processes} + \text{harq-ProcID-Offset2}$$

Specifically, CURRENT_symbol=(SFN×numberOfSlotsPerFrame×numberOfSymbolsPerSlot+slot number in the frame×numberOfSymbolsPerSlot+symbol number in the slot), and numberOfSlotsPerFrame and numberOfSymbolsPerSlot respectively refer to the number of consecutive slots per frame and the number of consecutive symbols per slot.

In some implementations, if cg-RetransmissionTimer is not configured, a HARQ process is not shared between different CG configurations in the same BWP.

In some implementations, harq-ProcID-Offset2 cannot be configured simultaneously with cg-RetransmissionTimer in the same CG configuration (e.g., ConfiguredGrantConfig IE).

Feature 2-2: RV Selection of a CG PUSCH Based on Configuration

In some implementations, the RV of a CG PUSCH may be selected based on repk-RV configured in the CG configuration (e.g., configuredGrantConfig IE) that the CG-PUSCH corresponds to, where repK-RV defines the redundancy version pattern to be applied to the repetitions.

If neither repK-RV nor cg-RetransmissionTimer is configured in a CG configuration (e.g., configuredGrantConfig IE), the RV for CG PUSCH corresponding to the CG configuration may be set to 0.

In some implementations, the parameters repK-RV and cg-RetransmissionTimer cannot be configured in the same CG configuration (e.g., configuredGrantConfig IE).

Feature 2-3: Autonomous Transmission of a MAC PDU/TB on a CG PUSCH

In some implementations, the UE may fail to transmit a MAC PDU/TB due to a first CG PUSCH being deprioritized, as a result of intra-UE prioritization. When a UE fails to transmit a generated MAC PDU/TB on a first CG PUSCH, the UE may perform autonomous transmission on a second CG PUSCH if at least one of the following conditions (a) to (e) is satisfied.
  (a) The TBS of the first CG PUSCH and the second CG PUSCH are the same.
  (b) The first CG PUSCH and the second CG PUSCH correspond to the same CG configuration in the same BWP.
  (c) The first CG PUSCH and the second CG PUSCH have the same HARQ process ID.
  Specifically, the second CG PUSCH, which has the same HARQ process ID as the first CG PUSCH, may be the CG PUSCH that becomes available first (e.g., that a UE receives first) after the first CG PUSCH.
  (d) The network has not provided a dynamic grant for retransmission of the first CG PUSCH.
  Specifically, the dynamic grant for retransmission of the first CG PUSCH may have the same HARQ process ID as the first CG PUSCH. If the network has provided a dynamic grant (e.g., a UL grant associated with C-RNTI or CS-RNTI) for retransmission of the first CG PUSCH before the second CG PUSCH becomes available, the second CG PUSCH may not be used for autonomous retransmission.
  (e) autonomousTx has been configured in the CG configuration (e.g., configuredGrantConfig IE) that the second CG PUSCH corresponds to.
  Specifically, the UE may perform autonomous transmission on a CG PUSCH if autonomousTx is configured in the CG configuration that the CG PUSCH corresponds to.

Feature 2-4: UE Behavior when a MAC PDU/TB is Deprioritized

In some implementations, if a CG PUSCH is not successfully transmitted due the CG PUSCH being deprioritized, the CG timer (e.g., configuredGrantTimer) that corresponds to the HARQ process ID of the CG PUSCH is not started or restarted.

One of the core objectives of NR Rel-17 WI on enhanced Industrial Internet of Things (IoT) and URLLC support is to ensure Rel-16 feature compatibility with unlicensed band IIoT/URLLC operation in a controlled environment. Particularly, UL enhancements for IIoT/URLLC in unlicensed controlled environments may be studied. For example, harmonizing UL configured grant enhancements in NR-U and IIoT/URLLC introduced in Rel-16 are to be applicable for unlicensed spectrum (i.e., shared spectrum).

An unlicensed controlled environment may be referred to as an unlicensed environment with controlled deployment. Therefore, interference from other systems using different radio access technology is not expected or sporadically happens. An example of an unlicensed controlled environment may be a factory with equipment (e.g., robots, actuators, sensors, etc.) that operates in an unlicensed band/carrier. Moreover, the equipment may be deployed in a specific manner such that they do not cause interference to one another. However, even with proper deployment, channel access (e.g., LBT/CCA) may still be required by an equipment (e.g., UE, gNB, etc.) before performing a transmission. This implies that LBT failure may still occur in an unlicensed controlled environment.

As described above, the CG mechanisms/schemes introduced in NR Rel-16 NR-U WI are designed specifically for an unlicensed environment where LBT failure may occur frequently. In contrast, the CG mechanisms/schemes introduced in NR Rel-16 IIoT/URLLC WI aims to meet the service requirement (e.g., delay requirement and reliability requirement) of IIoT/URLLC data traffic in a licensed environment. Based on the defined configuration restriction, these two types of mechanisms/schemes are not designed to be configured simultaneously.

Based on the objective of NR Rel-17 WI on enhanced Industrial Internet of Things (eIIoT) and URLLC support, a new mechanism may be required to harmonize configured uplink grant mechanism/schemes in introduced in Rel-16 NR-U WI and Rel-16 IIoT/URLLC WI. The new mechanism may need to ensure that IIoT/URLLC service requirement could be met in an unlicensed controlled environment where LBT failure may possibly occur.

The channel condition of an unlicensed controlled environment may be relatively stable because every equipment is properly deployed. Hence, derivation of HARQ process IDs of CG PUSCHs in a CG configuration may not always be solely based on UE implementation (e.g., as introduced in NR Rel-16 NR-U) or solely based on a predefined equation (e.g., as introduced in NR Rel-16 IIoT/URLLC). Instead, how a UE derives HARQ process IDs of CG PUSCHs in a CG configuration may be changed over time. For example, some of the PUSCHs that correspond to a CG configuration may be derived based on UE implementation and other PUSCHs that correspond to the same CG configuration may be derived based on a predefined equation.

Specifically, a UE may determine whether to derive a HARQ process ID of a CG PUSCH based on UE implementation or select a HARQ ID based on a predefined equation/preconfigured value. In a case that a UE determines to derive a HARQ process ID of a CG PUSCH based on a predefined equation, the UE may use either predefined equation 1 or predefined equation 2. In a case that the UE determines to derive a HARQ process ID of a CG PUSCH based on UE implementation, the HARQ process ID of the CG PUSCH may be selected among the HARQ process IDs available for the CG configuration that the CG PUSCH corresponds to.

In some implementations, if the UE selects a HARQ process ID of a CG PUSCH based on UE implementation, the UE may need to inform the network the selected HARQ process ID of a CG PUSCH, for example, via CG-UCI. In some implementations, the UE may toggle the NDI in the CG-UCI for new transmissions and may not toggle the NDI in the CG-UCI in retransmissions.

In some implementations, the UE may derive a HARQ process ID of a CG PUSCH based on UE implementation in a case that at least one of the following conditions (e.g., Condition 1-1 to Condition 1-5) has been satisfied. Otherwise, the UE may derive a HARQ process ID of a CG PUSCH in a CG configuration based on a predefined equation/preconfigured value.

Condition 1-1: If at Least One Specific IE has been or has not been Configured.

Specifically, a UE may derive a HARQ process ID of the CG PUSCH in a CG configuration based on UE implementation if one or more of the following specific IEs (a) to (m) has been configured and/or the other one or more of the following specific IEs (a) to (m) has not been configured. However, the present application is not limited herein, as other IEs may also be taken into consideration in Condition 1-1 in other implementations.

(a) cg-RetransmissionTimer
(b) configuredGrantTimer
(c) configuredGrantConfigIndex
(d) configuredGrantConfigIndexMAC
(e) ConfiguredGrantConfigToAddModList
(f) autonomousTx
(g) phy-PriorityIndex
(h) allowedCG-List
(i) Ich-BasedPrioritization
(j) harq-ProcID-Offset
(k) harq-ProcID-Offset2
(l) lbt-FailureRecoveryConfig
(m) repK-RV In some implementations, if a cg-RetransmissionTimer is configured in a CG configuration (e.g., ConfiguredGrantConfig IE), a UE may further determine to derive a HARQ process ID of a CG PUSCH of the CG configuration based on UE implementation or based on a predefined equation/preconfigured value according to the value of the cg-RetransmissionTimer (or the configuredGrantTimer configured in the same CG configuration). For example, the UE may derive a HARQ process ID of a CG PUSCH of the CG configuration based on UE implementation in a case that the value of the cg-RetransmissionTimer or the configuredGrantTimer is above a certain value (e.g. 0). On the other hand, the UE may derive a HARQ process ID of a CG PUSCH of the CG configuration based on a predefined equation/preconfigured value in a case that the value of the cg-RetransmissionTimer or the configuredGrantTimer is equal to a certain value (e.g. 0).

In some implementations, if cg-RetransmissionTimer is configured in a CG configuration (e.g., ConfiguredGrantConfig IE), a UE may further determine to derive a HARQ process ID of a CG PUSCH of the CG configuration based on UE implementation or a predefined equation/preconfigured value according to the presence of at least one specific IE. In a case that the at least one specific IE (e.g., harq-ProcID-Offset2) is not configured in the same CG configuration where cg-RetransmissionTimer is configured, the UE may derive a HARQ process ID of a CG PUSCH of the CG configuration based on UE implementation, or the UE may do so in a time duration, e.g., for a number of periods of the CG configuration. On the other hand, in a case that the at least one specific IE (e.g., harq-ProcID-Offset2) is configured in the same CG configuration where cg-RetransmissionTimer is configured, the UE may derive a HARQ process ID of a CG PUSCH of the CG configuration based on a predefined equation/preconfigured value, or the UE may do so in a time duration, e.g., for a number of periods of the CG configuration. In some implementations, in a case that the at least one specific IE (e.g., harq-ProcID-Offset2) is configured in the same CG configuration where cg-RetransmissionTimer is configured, the UE may be expected to receive an indication from the network (Condition 1-3) and derive a HARQ process ID of a CG PUSCH of the CG configuration via the instruction of the indication, or the UE may do so in a time duration, e.g., for a number of periods of the CG configuration or for a time period indicated in the indication from the network. Note that the at least one specific IE may be at least one of the IEs listed above.

In some implementations, some configuration restrictions may be defined. For example, a UE may or may not be configured with one or more of the specific IEs in a case that it has at least one of UE characteristic 1 to UE characteristic 4 listed below:

UE Characteristic 1: The UE has a Specific Type/Mode of Operation

For example, an FBE UE or a UE that operates as an FBE device may be considered having UE characteristic 1.

UE Characteristic 2: The UE has a Specific UE Access Identity and/or UE Access Category Introduced in 3GPP TS 38.331 V16.1.0.

For example, a UE may be considered having UE characteristic 2 if it has a specific UE access identity (e.g., Access Identity 1) and/or a specific UE access category (e.g., a UE Access Category of '1'). The UE access identity and/or UE access category may be, for example, provided by the NAS layer.

UE Characteristic 3: The UE has Reported a Specific UE Capability

For example, a UE may be considered having UE characteristic 3 if it has reported a specific UE capability to the network. The specific UE capability may be, for example, used for identifying an FBE UE.

UE Characteristics 4: The UE has been Configured with a Specific UE Indication

For example, a UE may be considered having UE characteristic 4 if it is configured, by the network, with a specific indication. The specific indication may be, for example, configured in mac-CellGroupConfig, physicalCellGroupConfig, spCellConfig, etc.

In some implementations, only a UE with at least one of UE characteristic 1 to UE characteristic 4 may be configured with both cg-RetransmissionTimer and harq-ProcID-Offset2 (simultaneously) in the same CG configuration (e.g., ConfiguredGrantConfig IE).

In some implementations, only a UE with at least one of UE characteristic 1 to UE characteristic 4 may be configured with cg-RetransmissionTimer or configuredGrantTimer IE and set them to be a value of 0.

In some implementations, only a UE with at least one of UE characteristic 1 to UE characteristic 4 may be configured with harq-ProcID-Offset2 in an unlicensed environment.

In some implementations, only a UE with at least one of UE characteristic 1 to UE characteristic 4 may not be configured with both cg-RetransmissionTimer and harq-ProcID-Offset simultaneously in the same CG configuration (e.g., ConfiguredGrantConfig IE).

Condition 1-2: If the CG PUSCH has at Least One Specific Characteristic.

Specifically, a UE may determine to derive a HARQ process ID of a CG PUSCH of a CG configuration based on UE implementation if the CG PUSCH has at least one of CG PUSCH characteristic 1 to CG PUSCH characteristic 4 listed below. Otherwise, the UE may derive a HARQ process ID of a CG PUSCH of a CG configuration based on a predefined equation/preconfigured value.

CG PUSCH characteristic 1: The CG PUSCH is for new transmission

In some implementations, the CG PUSCH may be for new transmission if the configuredGrantTimer for the HARQ process of the CG PUSCH is not running/configured and/or cg-RetransmissionTimer for the HARQ process of the CG PUSCH is not running/configured and/or the HARQ process is not pending.

In some implementations, the CG PUSCH may be for new transmission if it is part of a bundle of the CG configuration, and may be used for new transmission (e.g., initial transmission) according to clause 6.1.2.3 of 3GPP TS 38.214 V16.2.0, and if no MAC PDU has been obtained for this bundle.

CG PUSCH Characteristic 2: The CG PUSCH is for Retransmission

In some implementations, the CG PUSCH may be for retransmission if the configuredGrantTimer for the HARQ process of the CG PUSCH is running and/or the configuredGrantTimer for any HARQ process configured for the CG PUSCH is running (e.g., the configuredGrantTimer for any HARQ process of the CG configuration that CG PUSCH corresponds to is running) and/or the configuredGrantTimer for a HARQ process configured for the CG PUSCH was started or restarted in response to transmission of a CG PUSCH and/or cg-RetransmissionTimer for the HARQ process of the CG PUSCH is not running/configured and/or the HARQ process is pending and/or the previous uplink grant delivered for the same HARQ process was a configured uplink grant.

CG PUSCH Characteristic 3: The CG PUSCH has at Least One Specific Characteristic In some implementations, the CG PUSCH with the at least one specific characteristic may be, and is not limited to be, associated with a specific RNTI (e.g. MCS C-RNTI), specific PUSCH duration (or PUSCH duration smaller than a threshold), specific MCS table (e.g., qam64LowSE or other low BLER MCS table), corresponding to a CG configuration with a specific number of repetition, corresponding to a CG configuration with a specific periodicity, RAN profile, configured with non-slot based repetition (e.g., Type B repetition), etc.

CG PUSCH Characteristic 4: The CG PUSCH has at Least One Specific Characteristic in FBE Operation In some implementations, the CG PUSCH with at least one specific characteristic may be, and is not limited to be, associated with the time domain resource allocation of the CG configuration. For example, if some transmission occasions for initial transmission of the CG configuration are overlapping in time with idle period of an FFP associated with the gNB or an FFP associated with the UE, then the UE may derive a HARQ process ID of a CG PUSCH of the CG configuration based on UE implementation. For another example, if some transmission occasions for initial transmission of the CG configuration are starting right after an idle period of an FFP associated with the gNB or an FFP associated with the UE, then the UE may derive a HARQ process ID of a CG PUSCH of the CG configuration based on UE implementation. For another example, if some transmission occasions for initial transmission of the CG configuration is starting right after an idle period of an FFP associated with the UE, and UE is configured or indicated to initiate the FFP, then UE may derive a HARQ process ID of a CG PUSCH of the configured grant configuration based on UE implementation.

In some implementations, if cg-RetransmissionTimer is configured in a CG configuration, the UE may derive a HARQ process ID of a CG PUSCH of the CG configuration based on UE implementation if the CG PUSCH is for retransmission (e.g., the CG PUSCH is part of a bundle of the CG configuration and used for retransmission). On the other hand, the UE may derive a HARQ process ID of a CG PUSCH of the CG configuration based on a predefined equation/preconfigured value if the CG PUSCH is for new transmission (e.g., the CG PUSCH is part of a bundle of the CG configuration and used for initial transmission).

Condition 1-3: Reception of an Indication from the Network

In some implementations, the UE may determine to derive a HARQ process ID of the CG PUSCH based on either UE implementation or a predefined equation/preconfigured value via an indication from the network.

In some implementations, the indication may be DCI on PDCCH. In some implementations, the indication may be DCI with a specific DCI format (e.g., DCI format 0_0, 0_1, 0_2, 1, 2, etc.) or DCI with CRC scrambled by a specific RNTI (e.g., C-RNTI, CS-RNTI, MCS-C-RNTI, etc.) In some implementations, the indication may be DCI received on a specific search space/PDCCH/CORESET. The specific search space/PDCCH/CORESET may be either preconfigured or configured by the network, for example, via RRC signaling.

In some implementations, the indication may be indicated via a MAC CE. In some implementations, the indication may be a MAC CE that is identified by a specific Logical Channel Identity (LCID). In some implementations, the indication may be a MAC CE that is identified by a specific Logical Channel Identity (LCID) by a specific field within a MAC subheader of a MAC subPDU carrying the MAC CE. In some implementations, the indication may be a MAC CE that does not have a payload (e.g., a MAC CE with only a MAC subheader).

In some implementations, the indication may be indicated via an RRC message. In some implementations, the indication may be RRC signaling that is indicated by the network only upon request by a UE.

In some implementations, the indication may be provided by the network on a periodic basis.

In some implementations, the presence of a specific field in the indication may be used to indicate whether a UE shall derive a HARQ process ID of a CG PUSCH based on UE implementation or based on a predefined equation/preconfigured value. For example, in a case that the specific field in the indication is presented, a UE may derive a HARQ process ID of a CG PUSCH based on UE implementation. Otherwise, the UE may derive a HARQ process ID of a CG PUSCH based on a predefined equation/preconfigured value.

In some implementations, a UE may derive a HARQ process ID of a CG PUSCH based on UE implementation before receiving an indication from the network. Subsequently, upon reception of an indication from the network, the UE may derive a HARQ process ID of a CG PUSCH based on a predefined equation/preconfigured value. In some implementations, a UE may derive a HARQ process ID of a CG PUSCH based on a predefined equation/preconfigured value before receiving an indication from the network. Subsequently, upon reception of an indication from the network, the UE may derive a HARQ process ID of a CG PUSCH based on UE implementation.

In some implementations, the value of a specific field in the indication may be used to indicate whether a UE shall derive a HARQ process ID of a CG PUSCH based on UE implementation or based on a predefined equation/preconfigured value. For example, a first value of a specific field may be used to indicate that a UE shall derive a HARQ process ID of a CG PUSCH based on UE implementation, and a second value may be used to indicate the UE shall derive a HARQ process ID based on a predefined equation/preconfigured value.

In some implementations, the indication may explicitly indicate the HARQ process ID of a CG PUSCH that becomes available after receiving the indication. Moreover, the CG PUSCH may be the next available CG PUSCH that occurs after receiving the indication. Specifically, a CG PUSCH becomes available may imply that the CG PUSCH is for new transmission, such that a new MAC PDU/TB may be generated for transmission on the CG PUSCH.

In some implementations, a specific CG configuration may be identified explicitly via a MAC CE, DCI, or RRC signaling (e.g., cg-RetransmissionTimer). In some implementations, a specific CG configuration may be identified explicitly via the same MAC CE/DCI/RRC signaling as the indication that indicates whether a UE should derive a HARQ process ID of a CG PUSCH based on UE implementation or based on a predefined equation/preconfigured value.

In some implementations, the network may explicitly identify the specific CG configuration via a CG configuration ID (e.g., ConfiguredGrantConfigIndex, ConfiguredGrantConfigIndexMAC, etc.) of the specific CG configuration.

In some implementations, the network may explicitly indicate a BWP/Cell/Cell Group/Subset of a Cell group (e.g., via BWP-Id, ServCellIndex, etc.). Each of the CG configurations that are configured and activated in the BWP/Cell/Cell Group/Subset of a Cell group may be regarded as the specific CG configuration.

In some implementations, the network may explicitly identify the specific CG configuration via a DCI index in DCI, and the DCI index may be mapped to a CG configuration ID (e.g., ConfiguredGrantConfigIndex, ConfiguredGrantConfigIndexMAC, etc.) of the specific CG configuration. Moreover, a mapping table between a DCI index and a CG configuration ID may be provided by the network via RRC signaling.

In some implementations, the indication may explicitly identify the specific CG configuration via a bitmap. For example, a bitmap may include one or more bits in ascending or descending order based on the CG configuration ID, and each bit may correspond to a CG configuration. A first value of the bit may indicate that the UE may determine a HARQ process ID of a CG PUSCH of the corresponding CG configuration based on UE implementation, and a second value of the bit may indicate that the UE may determine a HARQ process ID of a CG PUSCH of the corresponding CG configuration based on a predefined equation/preconfigured value.

Figure 3:
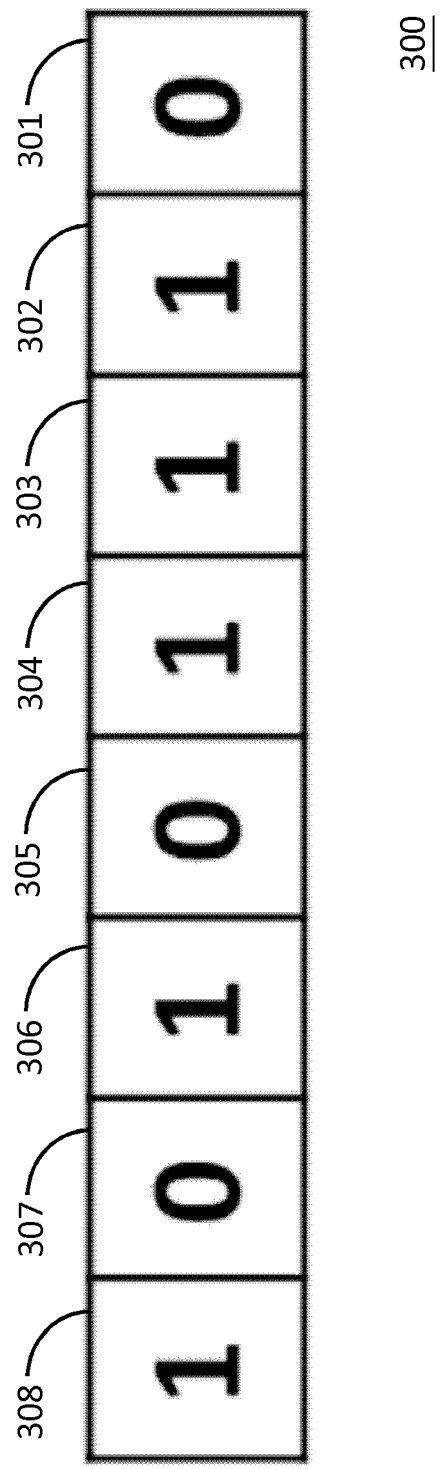
FIG. 3 is a diagram illustrating a bitmap according to an example implementation of the present application.

FIG. 3 is a diagram illustrating a bitmap according to an example implementation of the present application.

Referring to FIG. 3, eight bits 301 to 308 are included in a 1-octet bitmap 300, and each of the bits 301 to 308 corresponds to a configured grant configuration. A bit value of 1 indicates that the UE may derive a HARQ process ID of a CG PUSCH of the corresponding CG configuration based on UE implementation, and a bit value of 0 indicates that the UE may derive a HARQ process ID of a CG PUSCH of the corresponding CG configuration based on a predefined equation/preconfigured value.

For example, the first bit 301 corresponds to a first CG configuration, the second bit 302 corresponds to a second CG configuration, and so on. Bit values of the first bit 301, the fifth bit 305 and the seventh bit 307 are 0, therefore the UE may derive a HARQ process ID of a CG PUSCH of the first CG configuration, the fifth CG configuration, and the seventh CG configuration based on a predefined equation/preconfigured value. On the other hand, bit values of the second bit 302, the third bit 303, the fourth bit 304, the sixth bit 306 and the eighth bit 308 are 1; therefore, the UE may derive a HARQ process ID of a CG PUSCH of the second CG configuration, the third CG configuration, the fourth CG configuration, the sixth CG configuration, and the eighth CG configuration based on UE implementation.

In some implementations, a specific CG configuration may be identified by the indication implicitly via the BWP/cell/cell group/subset of cell group where the indication is received. In a case that an indication (e.g., an indication via DCI on PDCCH) is received at a BWP/cell/cell group, a specific CG configuration may be referred to as the CG configuration that is configured at the BWP/cell/cell group.

In some implementations, whether to derive a HARQ process ID of a CG PUSCH based on UE implementation or based on a predefined equation/preconfigured value after activation of a CG configuration and before receiving an indication from the network may be determined based on the value or presence of another indication (e.g., via RRC signaling, MAC CE, DCI, etc.) from the network.

In some implementations, if cg-RetransmissionTimer is configured in a CG configuration, a UE may derive a HARQ process ID of any CG PUSCH(s) that corresponds to this CG configuration based on UE implementation upon activation of the CG configuration. Subsequently, upon reception of an indication, the UE may derive a HARQ process ID of any CG PUSCH(s) that occur after the indication by following the instruction of the received indication, i.e., to derive the HARQ process ID based on a predefined equation/preconfigured value.

Figure 4:
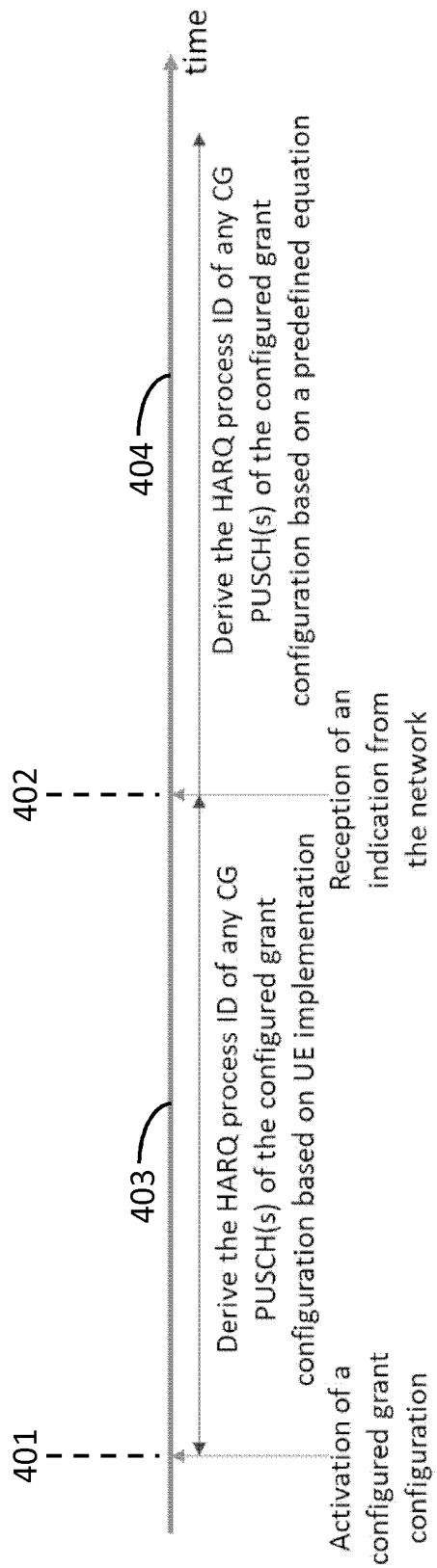
FIG. 4 is a diagram illustrating how a user equipment (UE) determines a hybrid automatic repeat request process ID of a CG physical uplink shared channel upon activation of the CG configuration according to an example implementation of the present application.

FIG. 4 is a diagram illustrating how a UE determines a HARQ process ID of a CG PUSCH upon activation of the CG configuration according to an example implementation of the present application.

Referring to FIG. 4, a CG configuration is activated at a first time point 401 and an indication is received from the network at a second time point 402. The UE may derive a HARQ process ID of any CG PUSCH(s) that corresponds to the CG configuration based on UE implementation upon activation of the CG configuration at the first time point 401, and the UE may derive a HARQ process ID of any CG PUSCH(s) that corresponds to the CG configuration based on a predefined equation/preconfigured value upon reception of an indication from the network at the second time point 402. In other words, in a first time interval 403 that starts from the first time point 401 and ends at the second time point 402, the UE may derive a HARQ process ID of any CG PUSCH(s) that corresponds to the CG configuration based on UE implementation; in a second time interval 404 that starts from the second time point 402, the UE may derive a HARQ process ID of any CG PUSCH(s) that corresponds to the CG configuration based on a predefined equation/preconfigured value.

In some implementations, if cg-RetransmissionTimer is not configured in a CG configuration, a UE may derive a HARQ process ID of any CG PUSCH(s) that corresponds to the CG configuration based on a predefined equation/preconfigured value upon activation of the CG configuration. Subsequently, upon reception of an indication, the UE may derive a HARQ process ID of any CG PUSCH(s) that occur after the indication based on UE implementation.

Condition 1-4: If a Specific Type of Channel Access Procedure (e.g., a Specific Type of LBT Category) is Used by the UE Before Performing the CG PUSCH Transmission In some implementations, a UE may derive a HARQ process ID of the CG PUSCH based on UE implementation if a specific type of channel access procedure (e.g., a specific type of LBT category) is used before performing the CG PUSCH transmission. On the other hand, the UE may derive the HARQ process ID of the CG PUSCH based on a predefined equation/preconfigured value if it is not using the specific type of channel access procedure.

Specifically, the specific type of channel access procedure may be a Type 1 or Type 2 (e.g., 2A, 2B, 2C, or 2D) channel access procedure. In some implementations, the network may indicate a UE whether to use the Type 1 channel access procedure or Type 2 channel access procedure before performing a UL transmission. In some implementations, the UE may determine itself whether to use Type 1 channel access procedure or Type 2 channel access procedure before performing a UL transmission. The UE may be, for example, an LBE device.

For example, a UE may derive a HARQ process ID of the CG PUSCH based on UE implementation if a Type 1 channel access procedure (e.g., a specific type of LBT category) is used before performing the CG PUSCH transmission. On the other hand, the UE may derive the HARQ process ID of the CG PUSCH based on a predefined equation/preconfigured value if a Type 2 (e.g., 2A, 2B, 2C, or 2D) channel access procedure is used before performing the CG PUSCH transmission.

Condition 1-5: If at Least One of the Network and a UE Operates as an FBE Device Specifically, a UE may determine to derive a HARQ process ID of the CG PUSCH based on UE implementation or a predefined equation/preconfigured value according to whether at least one of the UE and its serving network operates as an FBE device.

In some implementations, the UE and/or the network may be considered operating as an FBE device if the UE has been configured, by the network, channelAccessMode=SemiStaticChannelAccessConfig (e.g., 'semistatic' in 3GPP TS 37.213 V16.2.0). Moreover, the network may configure channelAccessMode=SemiStaticChannelAccessConfig (e.g., 'semistatic' in 3GPP TS 37.213 V16.2.0) to a UE via SIB1 or via dedicated configuration.

In some implementations, if the UE and/or the network is considered operating as an FBE device, the UE and/or the network may act as an initiating device. The initiating device may perform FBE-specific channel access (e.g., LBT) every T_x within every two consecutive radio frames, starting from the even indexed radio frame at x×T_x, and with a maximum COT, T_y=0.95×T_x, where T_x=period IE in unit of ms. Moreover, period IE may be configured, by the network, in SemiStaticChannelAccessConfig IE via SIB1 or via dedicated configuration.

In some implementations, a channel access (e.g., LBT) may be performed by sensing the channel at least during a sensing slot with a sensing slot duration T_sl=9 μs.

In some implementations, if an initiating device (e.g., network or UE) has successfully acquired a channel (e.g., the channel access is successful or the channel is sensed to be idle), the initiating device (e.g., network or UE) may share the COT (e.g., T_y) that it acquires with a responding device (e.g., UE or network).

In some implementations, if the UE and/or its serving network operates as an FBE device, and at least one of the following characteristics (a) and (b) has been satisfied, the UE may derive a HARQ process ID of the CG PUSCH based on one of UE implementation and a predefined equation/preconfigured value. Otherwise, the UE may derive a HARQ process ID of the CG PUSCH based on another one of UE implementation and a predefined equation/preconfigured value.

Characteristic (a): The network acts as an initiating device. If the network acts as an initiating device, it implies the UE acts as a responding device.

Characteristic (b): The UE acts as an initiating device and has successfully acquired a COT. If the UE acts as an initiating device, it implies the network acts as a responding device.

In some implementations, if the network acts as an initiating device and has successfully acquired a COT, the UE may derive a HARQ process ID of the CG PUSCH based on a predefined equation/preconfigured value (or UE implementation) if it satisfies the condition to transmit within the COT acquired by the network.

In some implementations, if the UE acts as an initiating device and has successfully acquired a COT, the UE may derive a HARQ process ID of the CG PUSCH based on a predefined equation/preconfigured value (or UE implementation) when transmitting within the acquired COT.

In some implementations, if a UE derives a HARQ process ID of a CG PUSCH based on UE implementation, the UE may also derive the RV of the CG PUSCH based on UE implementation.

In some implementations, if a UE derives a HARQ process ID of a CG PUSCH based on a predefined equation/preconfigured value, the UE may determine the RV of the CG PUSCH based on a specific rule as shown below:

If the parameter repK-RV is not provided in the configuredGrantConfig that the CG PUSCH corresponds to and cg-RetransmissionTimer is not provided in any of the CG configurations that are configured in a BWP, the redundancy version for uplink transmissions with a CG in the BWP may be set to 0.

If the parameter repK-RV is provided in the configuredGrantConfig that the CG PUSCH corresponds to and cg-RetransmissionTimer is not provided in any of the CG configurations that are configured in a BWP, for the nth transmission occasion among K repetitions, it is associated with $(\mod(n-1,4)+1)^{th}$ value in the configured RV sequence (e.g., repK-RV), where n=1, 2, . . . , K. Specifically, repK-RV may have a sequence of 0231, 0303, 0000, etc.

The channel condition of an unlicensed controlled environment may be relatively stable because every equipment is properly deployed. Hence, unlike the assumption made in NR Rel-16 NR-U, the network may not always need to send DFI for indicating ACK/NACK in response to an uplink transmission from a UE. Instead, whether a UE is expected to receive DFI may be changed over time and may be subjected to the channel condition.

In some implementations, whether a UE is expected to receive DFI (in a BWP/cell/cell group/subset of cell group) from the network may be based on a certain condition(s). For example, a UE is expected to receive DFI from the network in a case that the certain condition(s) is satisfied, and the UE is not expected to receive DFI from the network in a case that the certain condition(s) is not satisfied. For another example, a UE is expected to receive a DFI from the network in a case that the certain condition(s) is not satisfied, and the UE is not expected to receive DFI from the network in a case that the certain condition(s) is satisfied.

In some implementations, if a UE is not expected to receive DFI from the network, the UE may consider the DFI flag of a received DCI to be 0 bit. On the other hand, if a UE is expected to receive DFI from the network, the UE may consider the DFI flag of a received DCI to be 1 bit. A DFI flag may be included in a DCI, which has a format being used for scheduling one or multiple PUSCHs (e.g., a DCI with a format of 0_1) in the present disclosure.

In some implementations, if DFI is received and considered invalid, the UE may ignore the received DFI. For example, a UE may consider received DFI as valid in a case that certain condition(s) is satisfied, and the UE may consider a received DFI as invalid in a case that certain condition(s) is not satisfied. For another example, a UE may consider received DFI as invalid in a case that certain condition(s) is satisfied, and the UE may consider received DFI as valid in a case that certain condition(s) is not satisfied.

In some implementations, if a UE is not expected to receive DFI from the network, the UE may consider the value of the 1-bit DFI flag of received DCI to be a specific value that is not used for indicating DFI. In this case, the UE may still consider the field size of the DFI flag of the received DCI to be 1 bit.

In some implementations, if a UE is not expected to receive a DFI from the network, the HARQ process IDs indicated in received DCI may be considered invalid. The HARQ process IDs indicated in the received DCI may be referred to as the values indicated in a HARQ-ACK bitmap the received DCI. Moreover, the UE may still consider the field size of the DFI flag of the received DCI to be 1 bit.

In some implementations, if a DFI is considered invalid, the cg-RetransmissionTimer of a HARQ process may not be stopped when the UE receives the DFI for the corresponding HARQ process.

In some implementations, if DFI is considered invalid, the configuredGrantTimer of a HARQ process may not be stopped when the UE receives the DFI indicating ACK for the corresponding HARQ process.

In some implementations, whether a UE is expected to receive DFI from the network is based on at least one of Condition 2-1 to Condition 2-3 listed below.

Condition 2-1: If at Least One Specific IE is Configured

Specifically, whether a UE is expected to receive DFI is based on a configuration status of at least one of the specific IEs (a) to (n) listed below. More specifically, the configuration status of an IE represents whether the IE is configured or not. For example, if at least one of the specific IEs (a) to (n) is configured in at least one or all CG configuration in the BWP/cell/cell group/subset of cell group, the UE is expected to receive DFI in a BWP/cell/cell group/subset of cell group from the network; otherwise, the UE is not expected to receive DFI in a BWP/cell/cell group/subset of cell group from the network. For another example, if at least one of the specific IEs (a) to (n) is configured in at least one or all CG configuration in the BWP/cell/cell group/subset of cell group, the UE is not expected to receive DFI in a BWP/cell/cell group/subset of cell group from the network; otherwise, the UE is expected to receive DFI in a BWP/cell/cell group/subset of cell group from the network.

The specific IEs includes:
(a) cg-RetransmissionTimer;
(b) configuredGrantTimer;
(c) configuredGrantConfigIndex;
(d) configuredGrantConfigIndexMAC;
(e) ConfiguredGrantConfigToAddModList;
(f) autonomousTx;
(g) phy-PriorityIndex;
(h) allowedCG-List;
(i) lch-BasedPrioritization;
(j) harq-ProcID-Offset;
(k) harq-ProcID-Offset2;
(l) lbt-FailureRecoveryConfig;
(m) repK-RV;
(n) cg-minDFI-Delay.

In some implementations, a UE may not be expected to receive DFI in a BWP/cell/cell group/subset of cell group if cg-RetransmissionTimer and harq-ProcID-Offset2 autonomousTx are configured in at least one or all CG configuration in the BWP/cell/cell group/subset of cell group.

In some implementations, a UE may not be expected to receive DFI in a BWP/cell/cell group/subset of cell group if cg-minDFI-Delay is not configured in at least one or all CG configuration in the BWP/cell/cell group/subset of cell group.

In some implementations, a UE may not be expected to receive DFI in a BWP/cell/cell group/subset of cell group if cg-RetransmissionTimer is not configured or the value of cg-RetransmissionTimer is 0 in at least one or all CG configuration in the BWP/cell/cell group/subset of cell group.

Condition 2-2: If a UE Determines to Derive a HARQ Process ID of a CG PUSCH Based on a Predefined Equation.

Specifically, whether a UE is expected to receive DFI is based on how the UE determines to derive a HARQ process ID of a CG PUSCH. In some implementations, the UE may determine how to derive a HARQ process ID of a CG PUSCH based on one of the aforementioned example implementations. For example, if a UE determines to derive a HARQ process ID of a CG PUSCH based on a predefined equation, the UE may not be expected to receive DFI in the BWP/cell that the CG PUSCH is configured/scheduled.

Condition 2-3: If the Network and/or a UE Operates as an FBE Device.

In some implementations, if a UE and/or its serving network operates as an FBE device, the UE may not be expected to receive DFI.

In some implementations, if a UE and/or its serving network operates as an FBE device, and at least one of the following Characteristics (a) and (b) has been satisfied, the UE may not be expected to receive DFI.

Characteristic (a): The network acts as an initiating device. If the network acts as an initiating device, it implies the UE acts as a responding device.

Characteristic (b): The UE acts as an initiating device and has successfully acquired a COT. If the UE acts as an initiating device, it implies the network acts as a responding device.

In some implementations, if the network acts as an initiating device and has successfully acquired a COT, and a UE satisfies the condition to perform a UL transmission within the COT acquired by the network, the UE may not be expected to receive DFI in the COT. Moreover, the UL transmission may be a transmission on a CG PUSCH, or a transmission on a PUSCH scheduled by a dynamic grant, but which is not limited herein.

In some implementations, if the UE acts as an initiating device and has successfully acquired a COT, the UE may be expected to receive DFI in the COT.

In some implementations, when transmission is performed successfully on a first CG PUSCH (e.g., no LBT failure indication is received from PHY for the first CG PUSCH or the first CG PUSCH is not deprioritized as a result of intra-UE prioritization), a UE may not (re)start a configured CG retransmission timer (e.g., cg-RetransmissionTimer) for the HARQ process of the first CG PUSCH if at least one of criterion 1 to criterion 4 listed below is satisfied.

Criterion 1: If Valid DFI has been Received

In some implementations, if valid DFI has been received, and the DFI indicates HARQ ACK for a HARQ process that corresponds to a second CG PUSCH occurred before the first CG PUSCH the UE may not (re)start the CG retransmission timer (e.g., cg-RetransmissionTimer) for the HARQ process of a CG PUSCH when the CG PUSCH is successfully transmitted.

In some implementations, the starting/ending symbol (or slot) of the DFI is received within a first period before the starting/ending symbol (or slot) of the first CG PUSCH. In some implementations, the starting/ending symbol (or slot) of the second CG PUSCH may occur within a second period before the starting/ending symbol (or slot) of the first CG PUSCH. For example, the first period and/or the second period may be configured by the network via DCI, MAC CE, or RRC signaling, and may be in symbols, slots, milliseconds, etc.

In some implementations, the first CG PUSCH may be the next available CG PUSCH that occurs after the second CG PUSCH for the same/different CG configuration.

Criterion 2: If the Network and/or a UE Operates as an FBE Device

In some implementations, if a UE and/or its serving network operates as an FBE device, the UE may not (re)start the CG retransmission timer (e.g., cg-RetransmissionTimer) for the HARQ process of a CG PUSCH when the CG PUSCH is successfully transmitted.

In some implementations, if a UE and/or its serving network operates as an FBE device, and at least one of the following Characteristics (a) and (b) has been satisfied, the UE may not (re)start the CG retransmission timer (e.g., cg-RetransmissionTimer) for the HARQ process of a CG PUSCH when the CG PUSCH is successfully transmitted.

- Characteristic (a): The network acts as an initiating device. If the network acts as an initiating device, it implies the UE acts as a responding device.
- Characteristic (b): The UE acts as an initiating device and has successfully acquired a COT. If the UE acts as an initiating device, it implies the network acts as a responding device.

In some implementations, if the network acts as an initiating device and has successfully acquired a COT, and a CG PUSCH is scheduled within the COT acquired by the network, the UE may not (re)start the CG retransmission timer (e.g., cg-RetransmissionTimer) for the HARQ process of the CG PUSCH when the CG PUSCH is successfully transmitted.

In some implementations, if the UE acts as an initiating device and has successfully acquired a COT, and a CG PUSCH is scheduled within the UE-initiated COT, the UE may not (re)start the CG retransmission timer (e.g., cg-RetransmissionTimer) for the HARQ process of the CG PUSCH when the CG PUSCH is successfully transmitted.

Criterion 3: If the HARQ Process ID of a CG PUSCH is Derived Based on a Predefined Equation In some implementations, if the HARQ process ID of a CG PUSCH is derived based on a predefined equation, the UE may not (re)start the CG retransmission timer (e.g., cg-RetransmissionTimer) for the HARQ process of the CG PUSCH when the CG PUSCH is successfully transmitted.

Criterion 4: If a Specific Type of Channel Access Procedure is Used for the CG PUSCH In some implementations, if a specific type of channel access procedure (e.g., a specific type of LBT category) is used before performing the transmission on a CG PUSCH, the UE may not (re)start the CG retransmission timer (e.g., cg-RetransmissionTimer) for the HARQ process of the CG PUSCH when the CG PUSCH is successfully transmitted. Specifically, the specific type of channel access procedure may be a Type 1 or Type 2 (e.g., 2A, 2B, 2C, or 2D) channel access procedure. Either the network may indicate a UE, or the UE may determine itself whether to use a Type 1 channel access procedure or a Type 2 channel access procedure before performing a UL transmission. The UE may be, for example, an LBE device.

Following descriptions may be used to further elaborate the term, example, implementation, action, and/or behavior mentioned above.

A network may be a fixed station or base station used for communicating with the terminals and may also be referred to as an access point, a Node B, a base station, an enhanced base station, an eNodeB, a gNodeB (gNB), or some other terminology.

An unlicensed environment may be referred to as a shared spectrum, an unlicensed spectrum, and/or an unlicensed band, a cell that operates with shared spectrum channel access, etc.

The CC may be PCell, PSCell, and/or SCell.

The SpCell may include PCell and PSCell.

The UL resource may be RACH resource, PUCCH resource, and/or PUSCH resource. The UL resource may be scheduled by dynamic grant (e.g., via PDCCH) and/or configured by RRC (e.g., type 1/type 2 configured UL grant or pre-configured in RRC configuration).

The MAC entity may be referred to as the UE.

Intra-UE prioritization may be needed if two or more UL resources (scheduled/configured in the same serving cell) that overlap in the time domain, in which a UE selects one, out of the overlapping UL resources, for transmission.

The overlap of the resource may mean partially overlap and/or fully overlap.

The CG may be (but is not limited to) CG Type 1 or CG Type 2.

There are two types of transmission without dynamic grant: CG Type 1 and CG Type 2.

With respect to CG Type 1, an uplink grant is provided by RRC, and stored as a configured uplink grant.

With respect to CG Type 2, an uplink grant is provided by PDCCH, and stored or cleared as a configured uplink grant based on L1 signaling indicating configured uplink grant activation or deactivation.

A configured uplink grant may be referred to as a PUSCH resource that corresponds to a CG configuration.

A CG PUSCH may be referred to as a PUSCH that corresponds to a CG configuration.

HARQ-ACK may be either ACK or NACK.

The UE may consider a generated MAC PDU/TB as being obtained.

A frame based equipment (FBE) shall implement a listen before talk (LBT) based channel access mechanism to detect the presence of other RLAN transmissions on an operating channel.

In various implementations, intra-UE prioritization may be needed by a UE if two or more UL resources (scheduled/configured in the same serving cell) overlap in the time domain. As a result of intra-UE prioritization, the UE may select a UL resource from the overlapping UL resources for transmission. The selected UL resource may be referred to as the prioritized UL resource, and the MAC PDU/TB to be transmitted on the UL resource may be referred to as the prioritized MAC PDU/TB. On the other hand, one or more UL resources that are not selected may be referred to as one or more deprioritized UL resources, and the MAC PDU(s)/TB(s) to be transmitted on the deprioritized UL resources may be referred to as the deprioritized MAC PDUs/TBs.

Either the network may indicate a UE, or the UE may determine itself whether to use a Type 1 channel access procedure or a Type 2 channel access procedure before performing a UL transmission. Specifically, a type 2 channel access procedure may be further classified into Type 2A, Type 2B, Type 2C, and Type 2D channel access procedure according to 3GPP TS 37.213 V16.2.0.

A channel occupancy initiated by an initiating device (e.g., gNB) and shared with a responding device (e.g., UE) may satisfy the following:

The initiating device (e.g., gNB) shall transmit DL or UL transmission bursts starting at the beginning of the COT immediately after performing channel access and senses the channel to be idle for at least a sensing slot duration $T\_sl=9$ µs. In a case that the channel is sensed to be busy after performing channel access, the initiating device (e.g., gNB) shall not perform any transmission during the current COT.

The initiating device (e.g., gNB) may transmit DL or UL transmission bursts within the COT immediately after performing channel access and senses the channel to be idle for at least a sensing slot duration $T\_sl=9$ µs if the gap between the DL or UL transmission bursts and any previous transmission burst is more than 16 µs.

The initiating device (e.g., gNB) may transmit a DL transmission burst after a UL transmission burst within the COT without performing channel access/sensing the channel if the gap between the DL and UL transmission bursts is at most 16 µs. The initiating device (e.g., gNB) may transmit a UL transmission burst after a DL transmission burst within the COT without performing channel access/sensing the channel if the gap between the UL and DL transmission bursts is at most 16 µs.

The responding device (e.g., UE) may transmit a UL transmission burst after detection of a DL transmission burst within the COT (acquired by the initiating device) as follows:

If the gap between the UL and DL transmission bursts is at most 16 µs, the responding device (e.g., UE) may transmit a UL transmission burst after a DL transmission burst within the COT (acquired by the initiating device) without performing channel access/sensing the channel.

If the gap between the UL and DL transmission bursts is more than 16 µs, the responding device (e.g., UE) may transmit a UL transmission burst after a DL transmission burst within the COT (acquired by the initiating device) after performing channel access and senses the channel to be idle for at least a sensing slot duration $T\_sl=9$ µs within a 25 µs interval ending immediately before transmission.

The responding device (e.g., UE) may transmit a DL transmission burst after detection of a UL transmission burst within the COT (acquired by the initiating device) as follows:

If the gap between the DL and UL transmission bursts is at most 16 µs, the responding device (e.g., UE) may transmit a DL transmission burst after a UL transmission burst within the COT (acquired by the initiating device) without performing channel access/sensing the channel.

If the gap between the DL and UL transmission bursts is more than 16 µs, the responding device (e.g., UE) may transmit a DL transmission burst after a UL transmission burst within the COT (acquired by the initiating device) after performing channel access and senses the channel to be idle for at least a sensing slot duration $T\_sl=9$ µs within a 25 µs interval ending immediately before transmission.

The initiating device (e.g., gNB) and responding devices (e.g., UEs) shall not transmit any transmissions in a set of consecutive symbols for a duration of at least $T\_z=\max(0.05T\_x, 100$ µs$)$ before the start of the next COT.

If a UE fails to access the channel (e.g., LBT failure) prior to an intended UL transmission to a network, Layer 1 (e.g., PHY) notifies higher layers (e.g., MAC) about the channel access failure (e.g., by sending an LBT failure indication).

When cg-RetransmissionTimer is configured and the HARQ entity obtains a MAC PDU to transmit, the corresponding HARQ process is considered to be pending. For a configured uplink grant, configured with cg-RetransmissionTimer, each associated HARQ process is considered as not pending when any of the following conditions is satisfied:

A transmission is performed on that HARQ process and LBT failure indication is not received from lower layers.

The configured uplink grant is initialized and this HARQ process is not associated with another active configured uplink grant.

A HARQ buffer for this HARQ process is flushed.

In some implementations, a HARQ process ID of a CG configuration may be considered for retransmission if either one of the following conditions is satisfied:
    configuredGrantTimer of the HARQ process ID is running (and the HARQ process is pending/not pending);
    configuredGrantTimer for the HARQ process ID is not running and the HARQ process is pending.

In some implementations, a HARQ process of a CG configuration may be considered for new transmission (e.g., initial transmission) if the configuredGrantTimer of the HARQ process ID is not running (and the HARQ ID is not pending).

In some implementations, whether a UE is expected to receive DFI may be changed over time and may be subjected to the channel condition. Therefore, the UE may interpret two pieces of received downlink control information (DCI) (e.g., DCI format 0_1) in different ways. Specifically, the UE may interpret the received DCI as including a field of a downlink feedback information (DFI) flag in a case that the UE is expected to receive DFI, and the UE may interpret the received DCI as not including the field of the DFI flag in a case that the UE is not expected to receive DFI.

For example, first DCI may be received by the UE at a first time point at which the channel condition is better than a predetermined criterion, and second DCI may be received by the UE at a second time point at which the channel condition is worse than the predetermined criterion. The UE may interpret the first DCI by considering the field size of the DFI flag to be 0 bit, and the DCI may be, for example, generated by and sent from the network to schedule a PUSCH for a retransmission or a new transmission for the UE. On the other hand, the UE may interpret the second DCI by considering the field size of the DFI flag to be at least 1 bit, and the DCI may be, for example, generated by and sent from the network and including DFI which indicates at least one ACK/NACK in response to at least one uplink transmission from the UE.

Figure 5:
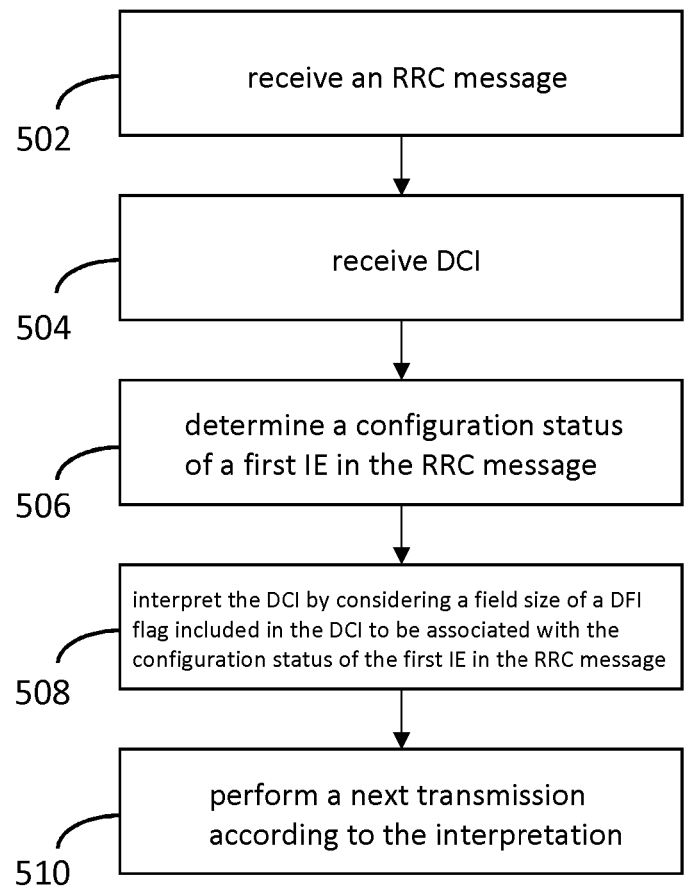
FIG. 5 is a flowchart illustrating a method performed by a UE for interpreting downlink control information (DCI) according to an example implementation of the present application.

FIG. 5 is a flowchart illustrating a method performed by a UE for interpreting DCI according to an example implementation of the present application.

Referring to FIG. 5, although actions 502 to 510 are illustrated as separate actions represented as independent blocks, these separately illustrated actions should not be construed as necessarily order dependent. The order in which the actions are performed in FIG. 5 is not intended to be construed as a limitation, and any number of the disclosed blocks may be combined in any order to implement the method, or an alternate method.

In action 502, the UE may receive a radio resource control (RRC) message.

Specifically, the UE may receive an RRC message (e.g., from the network) which indicates to the UE whether DFI is included in DCI, and the UE may interpret received DCI according to the indication in the RRC message. Through the RRC message, the network may efficiently communicate with the UE, such that whether or not the UE is expected to receive DFI may be changed over time and subjected to the channel condition.

In some implementations, the indication may be conveyed by a configuration status of at least one specific IE. For example, the indication may be conveyed by whether the at least one specific IE is configured in the RRC message. For another example, the indication may be conveyed by at least one value set in the at least one specific IE configured in the RRC message.

In some implementations, the RRC message may be an RRC reconfiguration message, and the at least one specific IE may include an IE (i.e., a first IE) indicating a timer associated with a transmission (e.g., an uplink transmission) of the UE and included in another IE (i.e., a second IE) used to configure a CG configuration. For example, the first IE indicating the timer may be denoted as cg-Retransmission-Timer which is included in the second IE ConfiguredGrant-Config used to configure a CG configuration. However, the disclosure is not so limited herein.

In some implementations, the timer indicated by the first IE may indicate whether the UE is capable of performing a retransmission on a CG PUSCH. In some implementations, a configuration status of the timer may indicate whether the UE is capable of performing retransmission on a CG PUSCH. Specifically, the configuration status of the timer or the first IE indicating the timer may represent whether the timer or the first IE is configured in the RRC message or not. For example, the timer may be a CG retransmission timer and the first IE may be the cg-RetransmissionTimer IE. In an RRC message (e.g., an RRC reconfiguration message), in a case that the configuration status shows that the cg-RetransmissionTimer IE is configured in a ConfiguredGrantConfig IE that configures a CG PUSCH (with a HARQ process ID), the UE is allowed to and capable of performing retransmission on the CG PUSCH (with the HARQ process ID); otherwise, the UE is prohibited from and incapable of performing retransmission on the CG PUSCH (with the HARQ process ID). However, the disclosure is not so limited herein.

In some implementations, the timer indicated by the first IE may be started by the UE upon a transmission on a CG PUSCH. For example, the timer may be a CG retransmission timer; therefore, the first IE may be the cg-Retransmission-Timer IE. The UE starts the CG retransmission timer (corresponding to a HARQ process ID) upon a transmission on a CG PUSCH (with the HARQ process ID), such that the UE is prohibited from and incapable of performing retransmission on the CG PUSCH (with the HARQ process ID) as long as the CG retransmission timer (corresponding to the HARQ process ID) is running. For example, the CG retransmission timer (corresponding to a HARQ process ID) may be started at a time point that the UE transmits data (e.g., TB/MAC PDU) on a CG PUSCH (with the HARQ process ID), and the UE is not allowed to perform retransmission on the CG PUSCH (with the HARQ process ID). On the other hand, once the CG retransmission timer (corresponding to a HARQ process ID) is expired, the UE is allowed to perform retransmission on the CG PUSCH (with the HARQ process ID), for example, in a case that the UE receives a "NACK" corresponding to the (HARQ process ID of the) CG PUSCH. However, the disclosure is not so limited herein.

In action 504, the UE may receive DCI.

Specifically, the UE may receive DCI from the network. The DCI is, for example, a DCI format 0_1. However, the disclosure is not so limited herein.

In some implementations, the UE may operate in an unlicensed environment. For example, the UE may operate in an unlicensed controlled environment and receive the DCI on a shared spectrum.

In some implementations, the network may detect a current channel condition. In a case that the current channel condition is better than a predetermined criterion, the network may generate DCI, which does not include DFI, to schedule a PUSCH for a retransmission or a new transmission for the UE and send the generated DCI to the UE. In a case that the current channel condition is worse than a predetermined criterion, the network may generate DCI, which includes DFI, to indicate to the UE at least one ACK/NACK in response to at least one uplink transmission from the UE.

In some implementations, the DCI and the RRC may be received from the same network (e.g., received from the same base station). As such, the network may generate multiple pieces of DCI with different field arrangements and notify the UE of the field arrangement of each piece of DCI through the RRC message. For example, the network may generate DCI including DFI and notify the UE that the DCI includes DFI through the RRC message, or the network may generate DCI not including DFI and notify the UE that the DCI does not include DFI through the RRC message. For another example, the network may generate DCI having a field size of a DFI flag and notify the UE of the field size of the DFI flag through the RRC message.

However, the disclosure is not so limited herein. In some implementations, the DCI and the RRC may not be received from the same network (e.g., received from different base stations); nonetheless, the field arrangement may be still indicated in the RRC message.

In action 506, the UE may determine a configuration status of a first IE in the RRC message.

Specifically, the configuration status of a first IE in the RRC message may indicate to the UE whether DFI is included in the DCI. Therefore, the UE may determine the configuration status of the first IE in the RRC message for interpreting the DCI received in the action 504. For example, when determining the configuration status of the first IE in the RRC message, the UE may determine whether the first IE is configured in the RRC message. For another example, when determining the configuration status of the first IE in the RRC message, the UE may determine a value of the first IE which is configured in the RRC message.

The example implementations of the first IE and the RRC message are disclosed in the foregoing description and are therefore not repeated herein.

In action 508, the UE may interpret the DCI by considering a field size of a DFI flag included in the DCI to be associated with the configuration status of the first IE in the RRC message.

Specifically, the UE may interpret the DCI in different ways based on different configuration status of the first IE in the RRC message. More specifically, the UE may interpret the DCI by considering the field size of the DFI flag included in the DCI to be associated with the configuration status of the first IE in the RRC message. For example, the UE may consider the field size of the DFI flag included in the DCI to be at least 1 bit in a case that the configuration status of the first IE in the RRC message indicates to the UE that the DFI is included in the DCI, and the UE may consider the field size of the DFI flag included in the DCI to be 0 bit in a case that the configuration status of the first IE in the RRC message indicates to the UE that the DFI is not included in the DCI.

Figure 6:
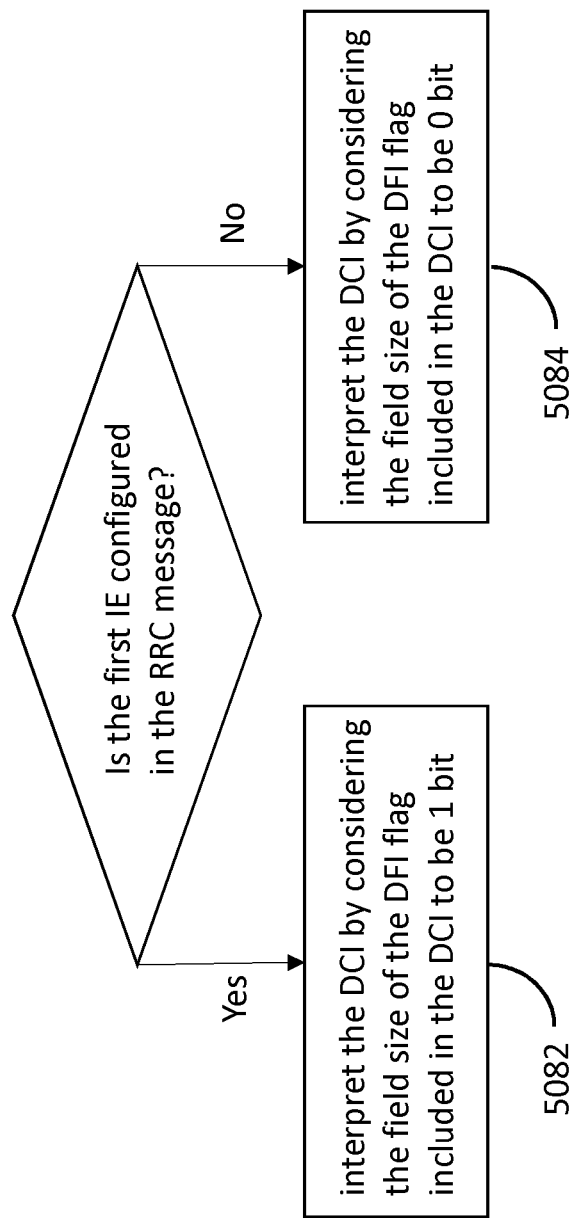
FIG. 6 is a flowchart illustrating an action of the method performed by a UE for interpreting DCI according to an example implementation of the present application.

FIG. 6 is a flowchart illustrating action 508 performed by a UE for interpreting DCI according to an example implementation of the present application.

In some implementations, the UE may interpret the DCI by considering the field size of the DFI flag to be 0 bit or 1 bit according to whether the first IE is configured in the RRC message. Referring to FIG. 6, in a case that the first IE is configured in the RRC message, action 5082 is performed; in a case that the first IE is not configured in the RRC message, action 5084 is performed.

In action 5082, the UE may interpret the DCI by considering the field size of the DFI flag included in the DCI to be 1 bit. Specifically, based on the determination in action 506 that the first UE is configured in the RRC message, the UE is expected to receive DFI. Therefore, the UE may consider the field size of the DFI flag to be 1 bit.

In action 5084, the UE may interpret the DCI by considering the field size of the DFI flag included in the DCI to be 0 bit. Specifically, based on the determination in action 506 that the first UE is not configured in the RRC message, the UE is not expected to receive DFI. Therefore, the UE may consider the field size of the DFI flag to be 0 bit.

In action 510, the UE may perform a next transmission according to the interpretation.

In some implementations, in a case that the UE interprets the DCI by considering the field size of the DFI flag included in the DCI to be 1 bit, the UE may obtain multiple ACK(s)/NACK(s) in response to multiple uplink transmissions from the UE in only one DCI payload. As such, the UE may perform retransmission for the uplink transmission corresponding to the "NACK" indicated in the DCI or the DFI. Comparing to receive one ACK/NACK payload in response to each uplink transmission, packing more ACK(s)/NACK(s) in one DCI or DFI payload may reduce latency and improve communication efficiency, especially in a poor channel condition, for example.

In some implementations, in a case that the UE interprets the DCI by considering the field size of the DFI flag included in the DCI to be 0 bit, the UE may obtain information of a scheduled CG PUSCH in the DCI payload, where the information of the scheduled CG PUSCH may include a HARQ process ID corresponding to the scheduled CG PUSCH and further includes a retransmission grant for the scheduled CG PUSCH (i.e., the scheduled CG PUSCH is configured for a retransmission) or a new transmission grant for the scheduled CG PUSCH (i.e., the scheduled CG PUSCH is configured for a new transmission). In a case that the CG PUSCH is scheduled for a retransmission, a "NACK" in response to a last uplink transmission is implied. As such, the UE may perform a retransmission for the last uplink transmission on the scheduled CG PUSCH. In a case that the CG PUSCH is scheduled for a new transmission, the UE may perform a new transmission (e.g., for a newly generated TB/MAC PDU) on the scheduled CG PUSCH.

Figure 7:
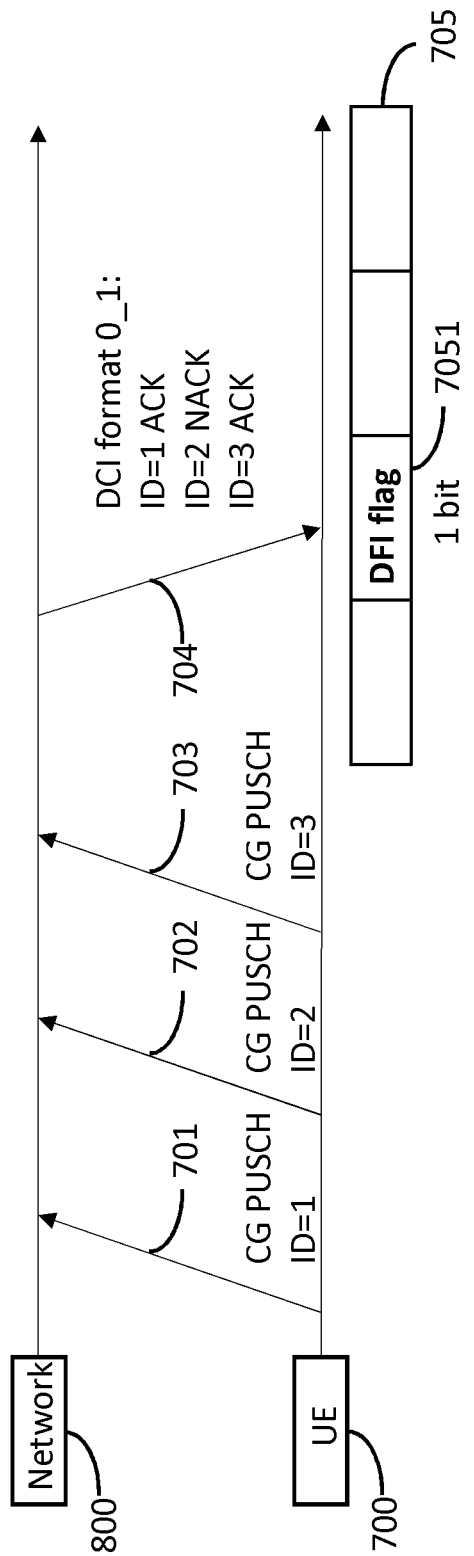
FIG. 7 is a diagram illustrating communications between a network and a UE according to an example implementation of the present application.
Figure 8:
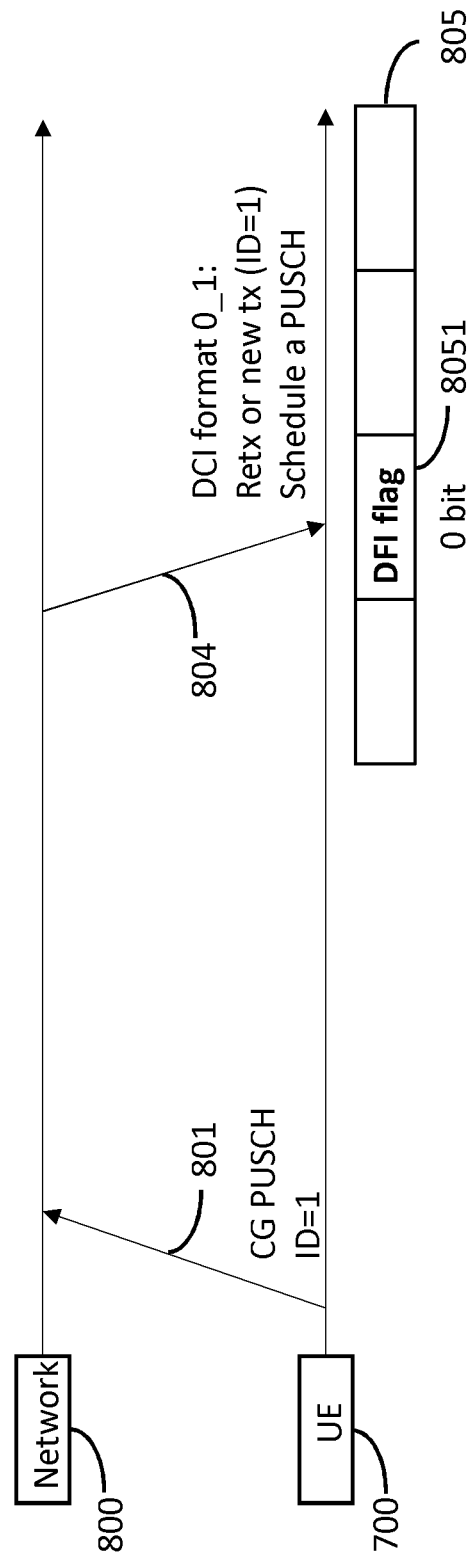
FIG. 8 is a diagram illustrating communications between a network and a UE according to another example implementation of the present application.

FIG. 7 and FIG. 8 are diagrams illustrating communications between a network and a UE according to example implementations of the present application.

In an example, referring to FIG. 7, the UE 700 may perform a first uplink transmission to the network 800 on a first CG PUSCH 701 with HARQ process ID 1, a second uplink transmission to the network 800 on a second CG PUSCH 702 with HARQ process ID 2 and a third uplink transmission to the network 800 on a third CG PUSCH 703 with HARQ process ID 3.

In this example, the network 800 may determine (e.g., based on a current channel condition) to generate DCI (e.g., DCI format 0_1) 705 including DFI for sending back to the UE 700 (e.g., via an available PDCCH 704). In the DCI 705, an "ACK" corresponding to the HARQ process ID 1, a "NACK" corresponding to the HARQ process ID 2, and an "ACK" corresponding to the HARQ process ID 3 are indicated.

In this example, the UE 700 may receive the DCI 705 from the network 800. Moreover, the UE 700 may receive an RRC message (not illustrated in FIG. 7) indicating that DFI is included in the DCI 705. Accordingly, the UE 700 may interpret the DCI 705 by considering a field size of the DFI flag 7051 included in the DCI 705 to be 1 bit and obtain the ACK(s)/NACK(s) corresponding to the three HARQ process IDs from the DCI 705. In response to the "NACK" corresponding to the HARQ process ID 2, the UE 700 may perform a retransmission for the second uplink transmission which corresponds to the HARD process ID 2 (e.g., retransmit the TB/MAC PDU that was transmitted in the second uplink transmission) on a next available CG PUSCH (e.g., when a CG retransmission timer corresponding to HARQ process ID 2 is expired).

In another example, referring to FIG. 8, the UE 700 may perform a first uplink transmission to the network 800 on a first CG PUSCH 801 with HARQ process ID 1.

In this example, the network 800 may determine (e.g., based on a current channel condition) to generate DCI (e.g., DCI format 0_1) 805 not including DFI for transmitting to the UE 700 (e.g., via an available PDCCH 804). A scheduled CG PUSCH is included in the DCI 805. Moreover, a retransmission grant for the scheduled CG PUSCH or a new transmission grant for the scheduled CG PUSCH (e.g., with a HARQ process ID 1) is also included in the DCI 805.

In this example, the UE 700 may receive the DCI 805 from the network 800. Moreover, the UE 700 may receive an RRC message (not illustrated in FIG. 8) indicating that DFI is not included in the DCI 705. Accordingly, the UE 700 may interpret the DCI 805 by considering a field size of the DFI flag 8051 included in the DCI 805 to be 0 bit and obtain the information of the scheduled CG PUSCH from the DCI 805.

In a case that a retransmission grant for the scheduled CG PUSCH is included in the DCI 805, a "NACK" in response to the first uplink transmission on the first CG PUSCH 801 with HARD process ID 1 is implied. As such, the UE 700 may perform a retransmission for the first uplink transmission (e.g., retransmit the TB/MAC PDU that was transmitted in the first uplink transmission) on the scheduled CG PUSCH with HARQ process ID 1.

In a case that a new transmission grant for the scheduled CG PUSCH (e.g., with HARQ process ID 1) is included in the DCI 805, the UE 700 may perform a new transmission on the scheduled CG PUSCH (e.g., for a newly generated TB/MAC PDU.)

According to the aforementioned method, the network may determine whether to transmit DFI for responding to the UE via DCI or to schedule a CG PUSCH for the UE via the DCI. Specifically, the network may determine to schedule a CG PUSCH for the UE via the DCI in an unlicensed environment without responding with an ACK/NACK payload or a DFI payload to the UE as long as, for example, the channel condition is fairly good. For example, in a case that a current channel condition is better than a predetermined criterion, the network may schedule a CG PUSCH for the UE via DCI while there is no need to respond with an ACK/NACK for each uplink transmission via the DCI; in a case that the current channel condition is worse than the predetermined criterion, the network may respond with multiple ACK(s)/NACK(s) to the UE in a single DCI payload by including DFI in the DCI. Advantageously, the flexibility and efficiency of the communications between the network and the UE may be improved.

Figure 9:
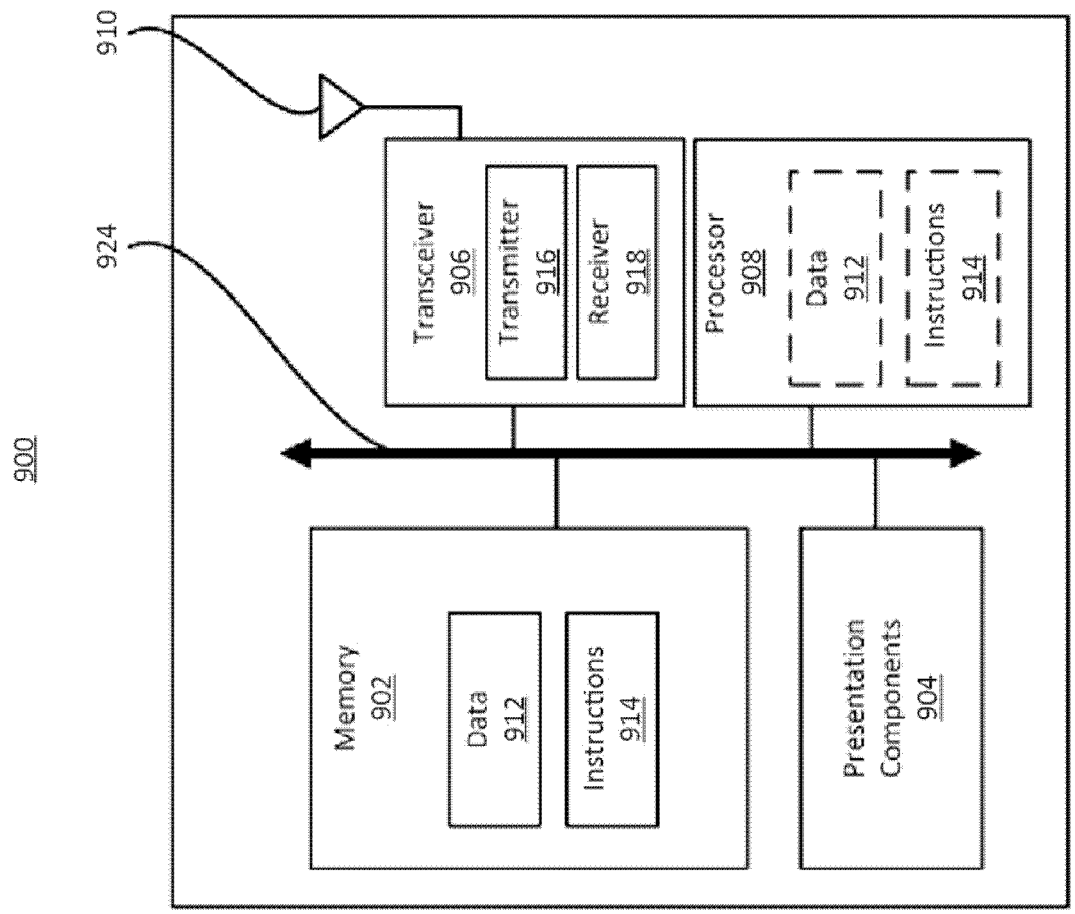
FIG. 9 is a block diagram illustrating a node for wireless communication according to an example implementation of the present application.

FIG. 9 is a block diagram illustrating a node for wireless communication according to an example implementation of the present application. As illustrated in FIG. 9, the node 900 may include a transceiver 906, a processor 908, a memory 902, one or more presentation components 904, and at least one antenna 910. The node 900 may also include an RF spectrum band module, a BS communications module, a network communications module, and a system communications management module, Input/Output (I/O) ports, I/O components, and a power supply (not explicitly illustrated in FIG. 9). Each of these components may be in communication with each other, directly or indirectly, over one or more buses 924. In some implementations, the node 900 may be a UE or a BS that performs various functions described herein, for example, with reference to FIGS. 1 through 8.

The transceiver 906 having a transmitter 916 (e.g., transmitting/transmission circuitry) and a receiver 918 (e.g., receiving/reception circuitry) may be configured to transmit and/or receive time and/or frequency resource partitioning information. In some implementations, the transceiver 906 may be configured to transmit in different types of subframes and slots, including, but not limited to, usable, non-usable and flexibly usable subframes and slot formats. The transceiver 906 may be configured to receive data and control channels.

The node 900 may include a variety of computer-readable media. Computer-readable media can be any available media that can be accessed by the node 900 and include both volatile (and non-volatile) media and removable (and non-removable) media. By way of example, and not limitation, computer-readable media may include computer storage media and communication media. Computer storage media may include both volatile (and/or non-volatile) and removable (and/or non-removable) media implemented according to any method or technology for storage of information such as computer-readable instructions, data structures, program modules or data.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media do not include a propagated data signal. Communication media may typically embody computer-readable instructions, data structures, program modules, or other data in a modulated data signal, such as a carrier wave, or other transport mechanisms and include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared, and other wireless media. Combinations of any of the above should also be included within the scope of computer-readable media.

The memory 902 may include computer storage media in the form of volatile and/or non-volatile memory. The memory 902 may be removable, non-removable, or a combination thereof. For example, the memory 902 may include solid-state memory, hard drives, optical-disc drives, etc. As illustrated in FIG. 9, the memory 902 may store computer-readable and/or computer-executable instructions 914 (e.g., software code(s) or computer-executable program(s)) that are configured to, when executed, cause the processor 908 to perform various functions described herein, for example, with reference to FIGS. 1 through 8. Alternatively, the instructions 914 may not be directly executable by the processor 908 but may be configured to cause the node 900 (e.g., when compiled and executed) to perform various functions described herein.

The processor 908 (e.g., having processing circuitry) may include an intelligent hardware device, a Central Processing Unit (CPU), a microcontroller, an ASIC, etc. The processor 908 may include memory. The processor 908 may process the data 912 and the instructions 914 received from the memory 902, and information through the transceiver 906, the baseband communications module, and/or the network communications module. The processor 908 may also process information to be sent to the transceiver 906 for transmission through the antenna 910, to the network communications module for transmission to a CN.

One or more presentation components 904 may present data indications to a person or other devices. Examples of presentation components 904 may include a display device, speaker, printing component, vibrating component, etc.

From the present disclosure, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present disclosure is not limited to the particular implementations described above. Still, many rearrangements, modifications, and substitutions are possible without departing from the scope of the present disclosure.

What is claimed is:

1. A method performed by a User Equipment (UE) for interpreting downlink control information (DCI), the method comprising:
   receiving a radio resource control (RRC) message;
   receiving DCI;
   determining a configuration status of a first information element (IE) in the RRC message; and
   interpreting the DCI by considering a field size of a downlink feedback information (DFI) flag included in the DCI to be associated with the configuration status of the first IE in the RRC message.

2. The method of claim 1, wherein interpreting the DCI by considering the field size of the DFI flag included in the DCI to be associated with the configuration status of the first IE in the RRC message comprises:
   in a case that the first IE is configured in the RRC message, interpreting the DCI by considering the field size of the DFI flag included in the DCI to be 1 bit; and in a case that the first IE is not configured in the RRC message, interpreting the DCI by considering the field size of the DFI flag included in the DCI to be 0 bit.

3. The method of claim 1, wherein the DCI is received on a shared spectrum.

4. The method of claim 1, wherein the first IE is configured to indicate whether the UE is capable of performing a retransmission on a configured grant physical uplink shared channel (CG-PUSCH).

5. The method of claim 1, wherein the first IE is configured for the UE to start a timer upon a transmission on a configured grant physical uplink shared channel (CG-PUSCH).

6. The method of claim 1, wherein the first IE is included in a second IE and the second IE is used to configure a configured grant (CG) configuration.

7. The method of claim 1, wherein the first IE is denoted as cg-RetransmissionTimer.

8. The method of claim 1, wherein the RRC message is an RRC reconfiguration message.

9. A User Equipment (UE) for interpreting downlink control information (DCI), comprising:
　processing circuitry;
　a transceiver coupled to the processing circuitry; and
　a memory coupled to the processing circuitry, wherein the memory stores at least one computer-executable program that, when executed by the processing circuitry, causes the UE to:
　receive a radio resource control (RRC) message via the transceiver;
　receive DCI via the transceiver;
　determine a configuration status of a first information element (IE) in the RRC message; and
　interpret the DCI by considering a field size of a downlink feedback information (DFI) flag included in the DCI to be associated with the configuration status of the first IE in the RRC message.

10. The UE of claim 9, wherein interpreting the DCI by considering the field size of the DFI flag included in the DCI to be associated with the configuration status of the first IE in the RRC message comprises:
　in a case that the first IE is configured in the RRC message, interpreting the DCI by considering the field size of the DFI flag included in the DCI to be 1 bit; and
　in a case that the first IE is not configured in the RRC message, interpreting the DCI by considering the field size of the DFI flag included in the DCI to be 0 bit.

11. The UE of claim 9, wherein receiving the DCI via the transceiver comprises:
　receiving the DCI on a shared spectrum via the transceiver.

12. The UE of claim 9, wherein the first IE is configured to indicate whether the UE is capable of performing a retransmission on a configured grant physical uplink shared channel (CG-PUSCH).

13. The UE of claim 9, wherein the first IE is configured for the UE to start a timer upon a transmission on a configured grant physical uplink shared channel (CG-PUSCH).

14. The UE of claim 9, wherein the first IE is included in a second IE and the second IE is used to configure a configured grant (CG) configuration.

15. The UE of claim 9, wherein the first IE is denoted as cg-Retransmission Timer.

16. The UE of claim 9, wherein the RRC message is an RRC reconfiguration message.

* * * * *